(12) United States Patent
Yamamoto et al.

(10) Patent No.: US 9,729,670 B2
(45) Date of Patent: Aug. 8, 2017

(54) INFORMATION PROCESSING SYSTEM AND CONTENT DOWNLOAD METHOD

(71) Applicant: Sony Computer Entertainment Inc., Tokyo (JP)

(72) Inventors: Hirotsugu Yamamoto, Tokyo (JP); Masayuki Chatani, Tokyo (JP)

(73) Assignees: Sony Corporation, Tokyo (JP); Sony Interactive Entertainment Inc., Tokyo (JP)

( * ) Notice: Subject to any disclaimer, the term of this patent is extended or adjusted under 35 U.S.C. 154(b) by 263 days.

(21) Appl. No.: 14/362,231

(22) PCT Filed: Dec. 5, 2012

(86) PCT No.: PCT/JP2012/007796
§ 371 (c)(1),
(2) Date: Jun. 2, 2014

(87) PCT Pub. No.: WO2013/088676
PCT Pub. Date: Jun. 20, 2013

(65) Prior Publication Data
US 2014/0337454 A1  Nov. 13, 2014

(30) Foreign Application Priority Data

Dec. 15, 2011 (JP) ................................. 2011-275108
Dec. 15, 2011 (JP) ................................. 2011-275109

(51) Int. Cl.
*H04L 29/08* (2006.01)
*H04N 21/25* (2011.01)
(Continued)

(52) U.S. Cl.
CPC ........... *H04L 67/34* (2013.01); *H04N 21/252* (2013.01); *H04N 21/2543* (2013.01);
(Continued)

(58) Field of Classification Search
CPC ................. H04L 65/60; H04L 65/4084; G06F 17/30053
See application file for complete search history.

(56) References Cited

U.S. PATENT DOCUMENTS 6,195,683 B1 * 2/2001 Palmer ................... H04N 7/147
   348/E7.083
6,560,612 B1   5/2003 Yamada
(Continued)

FOREIGN PATENT DOCUMENTS

CN       1859121 A    11/2006
CN     101686157 A     3/2010
(Continued)

OTHER PUBLICATIONS

International Preliminary Report on Patentability and Written Opinion for corresponding PCT Application PCT/2012/007796, dated Jun. 26, 2014.

(Continued)

*Primary Examiner* — Peling Shaw
(74) *Attorney, Agent, or Firm* — Matthew B. Dernier, Esq.

(57) ABSTRACT

In an information processing system, a speculative DL content information acceptor 324 accepts identification information of content selected by a server. A list generator generates a speculative DL list of the accepted content identification information. Based on the speculative DL list, a DL processor sets the time of start of download of content data and downloads the content data at the set time.

13 Claims, 16 Drawing Sheets

(51) Int. Cl.
*H04N 21/2543* (2011.01)
*H04N 21/258* (2011.01)
*H04N 21/458* (2011.01)
*H04N 21/6334* (2011.01)
*H04N 21/658* (2011.01)
*H04N 21/41* (2011.01)
*H04N 21/422* (2011.01)
*H04N 21/436* (2011.01)
*H04N 21/443* (2011.01)
*H04N 21/478* (2011.01)

(52) U.S. Cl.
CPC . *H04N 21/25875* (2013.01); *H04N 21/25891* (2013.01); *H04N 21/4122* (2013.01); *H04N 21/4126* (2013.01); *H04N 21/42204* (2013.01); *H04N 21/43615* (2013.01); *H04N 21/4436* (2013.01); *H04N 21/458* (2013.01); *H04N 21/4781* (2013.01); *H04N 21/63345* (2013.01); *H04N 21/6582* (2013.01)

(56) References Cited

U.S. PATENT DOCUMENTS

| | | | |
|---|---|---|---|
| 7,076,467 | B1 | 7/2006 | Chatani |
| 8,316,154 | B2* | 11/2012 | Yoneda ................. H04L 12/282 |
| | | | 709/203 |
| 8,627,489 | B2 | 1/2014 | Herbach |
| 8,869,239 | B2* | 10/2014 | Pahlavan .............. G06F 9/4445 |
| | | | 709/219 |
| 2002/0078142 | A1 | 6/2002 | Moore ..................... G06F 8/68 |
| | | | 709/203 |
| 2005/0044049 | A1* | 2/2005 | Okayama ............. G06Q 30/02 |
| | | | 705/59 |
| 2005/0097441 | A1* | 5/2005 | Herbach ................ G06F 21/10 |
| | | | 715/229 |
| 2006/0041923 | A1 | 2/2006 | McQuaide, Jr. |
| 2006/0085826 | A1 | 4/2006 | Funk |
| 2006/0087926 | A1* | 4/2006 | Hwang .................. G06F 21/10 |
| | | | 369/30.06 |
| 2007/0064157 | A1 | 3/2007 | Kasamatsu |
| 2008/0082633 | A1* | 4/2008 | Koyama ............. H04L 12/5695 |
| | | | 709/219 |
| 2008/0196066 | A1* | 8/2008 | Matz ..................... H04N 5/4401 |
| | | | 725/62 |
| 2009/0190582 | A1 | 7/2009 | Nambiath |
| 2010/0332613 | A1* | 12/2010 | Brakensiek ......... H04L 67/1095 |
| | | | 709/217 |
| 2010/0333135 | A1 | 12/2010 | Lau |
| 2011/0066971 | A1* | 3/2011 | Forutanpour ......... G06F 9/4443 |
| | | | 715/788 |
| 2014/0095872 | A1* | 4/2014 | Root ................... G06F 19/3412 |
| | | | 713/168 |

FOREIGN PATENT DOCUMENTS

| | | |
|---|---|---|
| EP | 2061228 A1 | 5/2009 |
| JP | 2001217964 A | 8/2001 |
| JP | 2004295719 A | 10/2004 |
| JP | 2004328768 A | 11/2004 |
| JP | 2006115299 A | 4/2006 |
| JP | 2007511821 A | 5/2007 |
| JP | 2008159193 A | 7/2008 |
| JP | 2009020785 A | 1/2009 |
| JP | 2010061395 A | 3/2010 |
| JP | 2010086029 A | 4/2010 |
| JP | 2011091496 A | 5/2011 |
| JP | 2011130363 A | 6/2011 |
| JP | 2011137885 A | 7/2011 |
| WO | 2005045709 A2 | 5/2005 |

OTHER PUBLICATIONS

International Search Report for corresponding PCT Application PCT/2012/007796, dated Mar. 5, 2013.
Office Action for corresponding JP Application 2011-275108, dated Jul. 14, 2015.
Search Report for corresponding EP Application 12858599.9, 6 pages, dated Oct. 5, 2015.
Office Action for corresponding JP Application No. 2011-275109, 8 pages, dated Dec. 15, 2015.
Search Report for corresponding EP Application 12858599.9, 12 pages, dated Feb. 9, 2016.
Office Action for corresponding CN Application 20128006357, 14 pages, dated May 27, 2017.

* cited by examiner

FIG. 7

GAME XYZ WILL BE

☐ DOWNLOADED IMMEDIATELY

☐ DOWNLOADED LATER

410

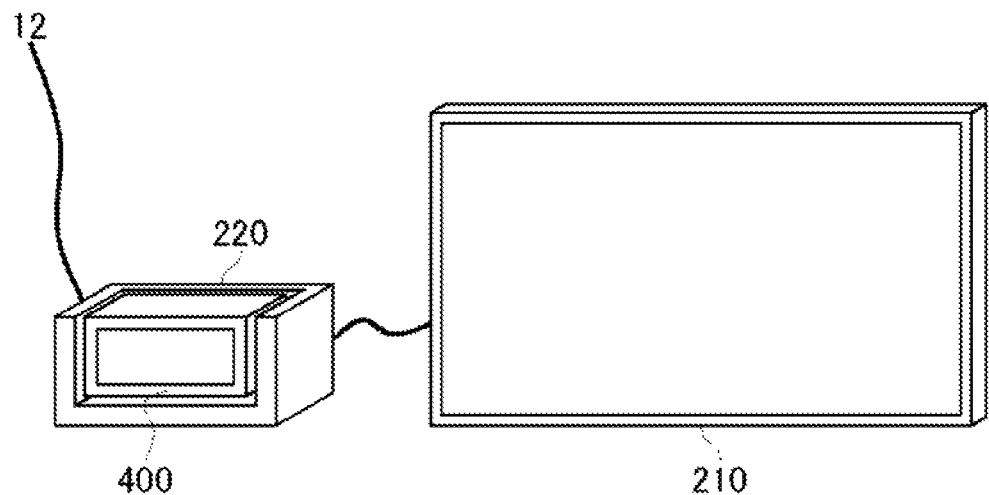
FIG.16

INFORMATION PROCESSING SYSTEM AND CONTENT DOWNLOAD METHOD

TECHNICAL FIELD

The present invention relates to an information processing technique.

BACKGROUND ART

In recent years, various services premised on wide-band network resources are provided. For example, regarding content linearly reproducible on the time axis, such as video and music, on-demand content distribution services by a streaming distribution technique have been already put into practical use.

CITATION LIST

Patent Literatures

[PTL 1]
U.S. Pat. No. 7,076,467A
[PTL 2]
U.S. Pat. No. 6,560,612A

SUMMARY

Technical Problems

On the other hand, it is not easy to carry out streaming distribution of interactive content typified by games and at least data to be possibly reproduced or executed non-linearly on the time axis needs to be downloaded and accumulated in a storage device of an information processing device in advance. However, in a conventional method in which download is started in response to a use request from a user, the content cannot be used until the end of the download and possibly the willingness to use the content is impaired if the download time is long particularly. Therefore, it is desired to provide a service that allows content to be used at timing desired by the user.

In general, an output device that outputs reproduced or executed content is connected to the information processing device. For example, in a game system in which a game is downloaded, the information processing device is a game device that executes the game and a television is connected to the game device. Therefore, in order to check downloaded content, the user needs to activate the game device and the television to display a list of pieces of content that have been downloaded on the television screen. If the game device and the television are always powered on, the user does not need to activate them anew. However, the power consumption of a large-screen television is particularly high and therefore it is undesirable to always leave the television on. Furthermore, similarly it is also undesirable to leave the game device on when the television is in the off-state. Therefore, it is desired to develop a system that allows the download status to be easily checked without making the user take trouble.

Thus, to solve the above-described problems, the present invention is intended to provide a novel information processing system. Furthermore, it is intended to provide a novel technique relating to content download.

Solution to Problems

To solve the above-described problems, an information processing system of a certain aspect of the present invention is an information processing system that connects to a server by a network. The information processing system includes a first accepting section that accepts content information selected by the server, a download processor that downloads content data identified by the content information accepted by the first accepting section, and a storage device that stores the downloaded content data.

Another aspect of the present invention is a content download method. This method includes a step of accepting content information selected by a server, a step of downloading content data identified by the accepted content information, and a step of storing the downloaded content data.

Another aspect of the present invention is an information processing system including a first system including a first device having a first communication section, a second system including a second device having a second communication section, and an input interface device that has a third communication section capable of communicating with the first communication section or the second communication section and transmits an input from a user to the first device or the second device. The first device and the second device are communicable. The first system has a first display and the second system or the input interface device has a second display.

What are obtained by translating arbitrary combinations of the above constituent elements and expressions of the present invention among method, device, system, recording medium, computer program, and so forth are also effective as aspects of the present invention.

Advantageous Effect Of The Invention

According to the present invention, a novel information processing system can be provided and a novel technique relating to content download can be provided.

BRIEF DESCRIPTION OF DRAWINGS

FIG. 7 is a diagram showing one example of a download mode selection screen displayed on the output device when a user selects unaccumulated content.

FIG. 16 is a diagram showing a modification example of the information processing system.

DESCRIPTION OF EMBODIMENTS

An information processing system of the present embodiment includes a main system that executes processing of content accumulated in a storage device, such as execution of a game and reproduction of a movie, a sub-system that holds icons and so forth of pieces of content accumulated in the main system, and an input interface device with which a user transmits an operation input to the main system and the sub-system. For example, the main system has a large-size display used when the user plays a game or watches a movie whereas the sub-system has a small-size display that displays the content icons. It is enough for the sub-system to hold the content icons and so forth and the small-size display may be provided on the input interface device. The large and small sizes of the displays may be relative ones.

In the information processing system, the large-size display provided in the main system may be activated (powered on) when needed, such as at the time of game execution and at the time of movie reproduction. On the other hand, because having lower power consumption compared with the large-size display, the small-size display provided in the sub-system or the input interface device may be always powered on so that information such as content icons can be presented to the user. Of course, the sub-system may be automatically turned off based on timer setting in a time zone when the user has no opportunity to view content information, such as late night.

When content processing or download processing is not executed, the main system is in the power-saving mode to avoid useless power consumption. In the present embodiment, because the sub-system is always powered on, the user can send a content download request or a content use request to the sub-system by using a content icon displayed on the small-size display. At this time, the sub-system activates the information processing device of the main system and transfers the request from the user to the information processing device of the main system. The large-size display of the main system does not necessarily need to be activated during execution of the download processing. Although the main system is in the power-saving mode, the user can always check the download status of content and so forth by the small-size display of the sub-system. This can provide an information processing system that is highly convenient for the user with reduction in the power consumption.

Figure 1:
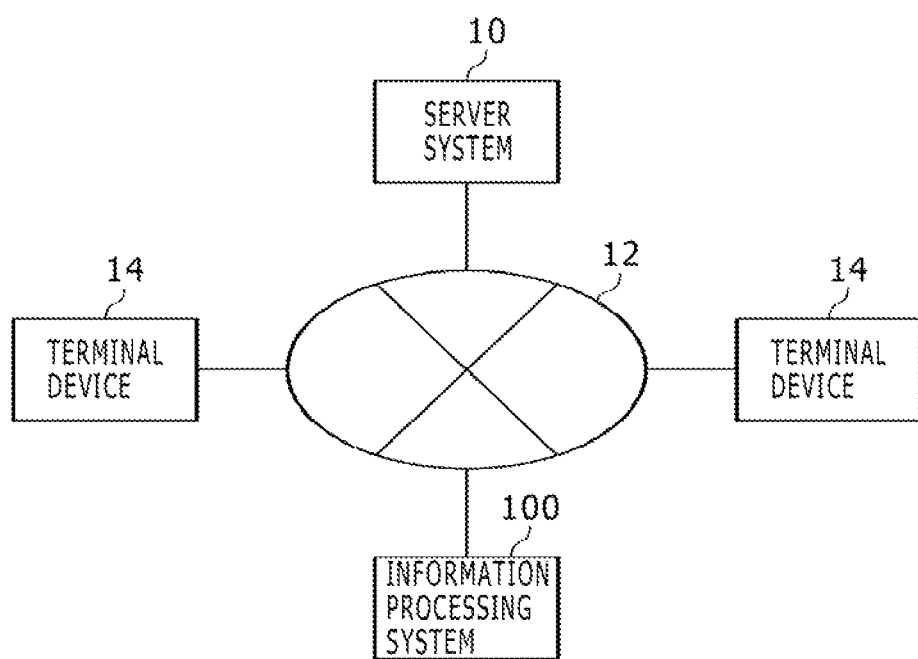
FIG. 1 is a diagram showing a content distribution system according to an embodiment of the present invention.

FIG. 1 shows a content distribution system 1 according to an embodiment of the present invention. The content distribution system 1 includes an information processing system 100 utilized by a user, plural terminal devices 14 utilized by other users, and a server system 10 that manages content. The information processing system 100, the terminal devices 14, and the server system 10 are communicably connected by a network 12. Although it is assumed that other users utilize the terminal devices 14 in the content distribution system 1 shown in FIG. 1 for convenience of explanation, all users may utilize the same system as the information processing system 100.

The server system 10 is operated by a content provider company or the like. When receiving a download request from the information processing system 100, it provides encrypted content to the information processing system 100. The server system 10 provides, to the information processing system 100, various kinds of content such as game content and video content. The server system 10 may be so configured as to include plural content servers such as server to provide game content, server to provide video content, and server to provide music content and may be operated by plural content provider companies. It is preferable for the server system 10 to have a server that performs overall management of the download status of the information processing system 100 and so forth even when being configured by plural content servers.

The information processing system 100 of the present embodiment allows downloads of three kinds of modes. In the present embodiment, to discriminate the kinds of download, they will be referred to as "immediate download," "suspended download," and "speculative download." These names are to merely discriminate the download methods and the download methods are not interpreted in a limited manner by the meanings of the names. Here, the "immediate download" and the "suspended download" are methods in which content selected by a user is downloaded and which of the "immediate download" and the "suspended download" is to be employed is decided by the user. The "speculative download" is a method in which content arbitrarily selected by a server is downloaded in a speculative manner, and content having no relation to selection by the user is transmitted. The information processing system 100 can execute also downloads of other modes.

In the mode of the "immediate download," content which the user desires to use is downloaded from the server system 10 immediately in response to a download request. The immediate download mode is selected when the user wants to use content immediately. Upon receiving a request for immediate download of content from the user, the information processing system 100 immediately downloads content from the server system 10 connected by the network.

In the mode of the "suspended download," at timing after a while after a download request is generated by the user, content which the user desires to use is downloaded from the server system 10 or the terminal device 14 of another user, connected by the network 12. The terminal device 14 of another user provides content to the information processing system 100 by so-called peer-to-peer (P2P) communication. The suspended download is selected if the user does not plan to use content at the timing when the user generates the download request and the user wants to use the content on the next day or later for example. It is preferable that the suspended download is carried out in a time zone when the load of the server system 10 and the terminal devices 14 of other users is comparatively light, such as late night. Because the load of network resources can be dispersed compared with the immediate download, the user who selects the suspended download mode may be offered a privilege such as giving of points that can be used in content purchase.

In the mode of the "speculative download," content selected by a server is downloaded from the server system 10 or the terminal device 14 of another user, connected by the network 12. The server system 10 selects content as the target of speculative download based on the preference of the user and so forth and transmits the content information thereof (e.g. information to identify the content) to the information processing system 100 in advance. It is preferable that the speculative download is carried out in a time zone when the load of the server system 10 and the terminal devices 14 of other users is comparatively light similarly to the suspended download. Because content as the target of the speculative download is not content requested by the user, it is preferable that the suspended download is carried out with priority given thereto over the speculative download.

In the speculative download mode, a mechanism is constructed in which a content fee is not incurred at the time of download of content and the user is charged when the encrypted content is activated, i.e. when it is decrypted to be set to the usable state. By this mechanism, the user can use content downloaded by the speculative download by merely executing activation processing. Furthermore, because the user is not charged by the speculative download of the content, useless expense is also not incurred. By employing such a speculative download mode, the content distribution system 1 highly convenient for the user is realized. An expiration date is set for the content downloaded by the speculative download and the information processing system 100 can avoid a situation in which the capacity of the storage device is tight by deleting content for which activation processing is not executed before the expiration date.

Figure 2:
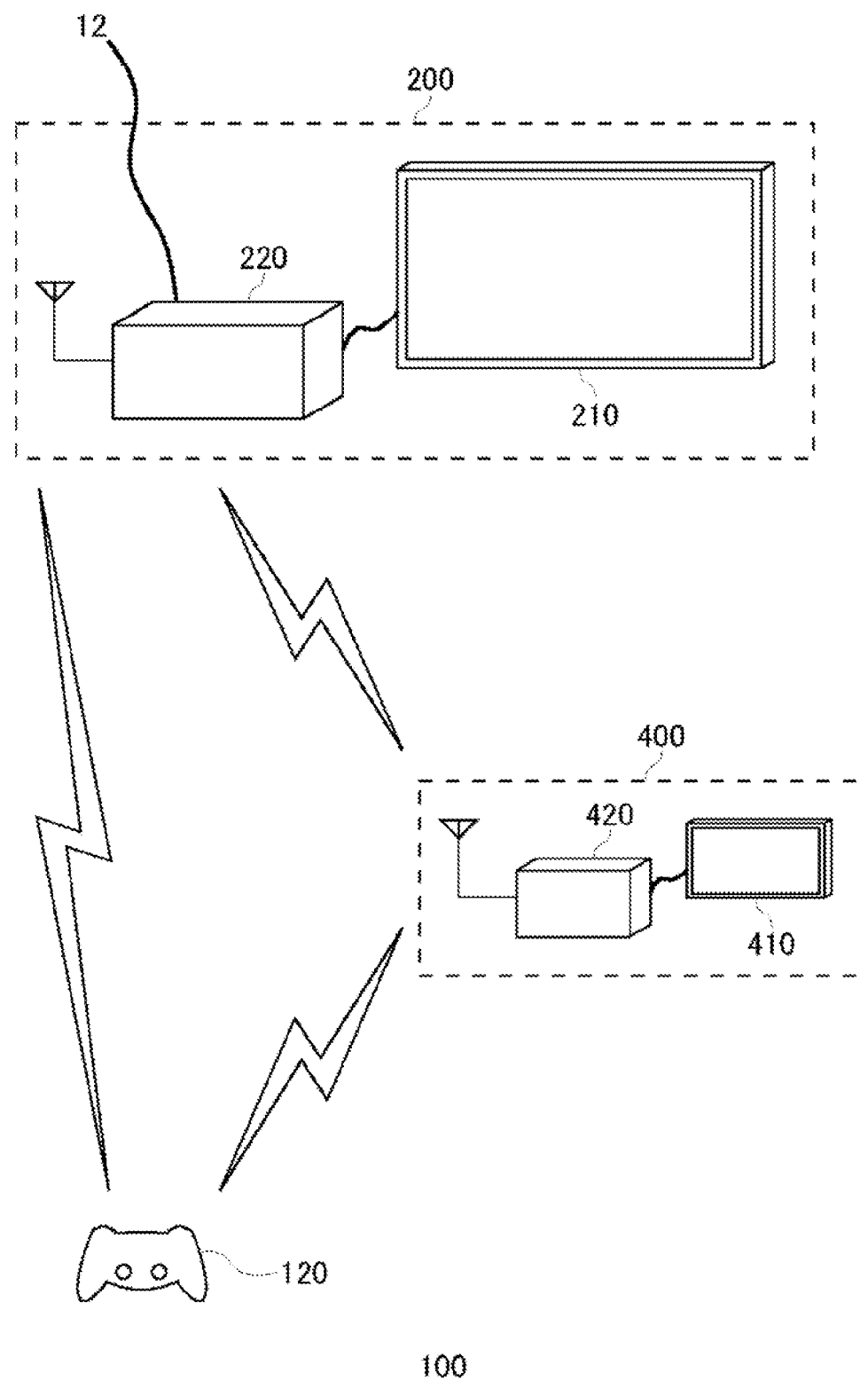
FIG. 2 is a diagram showing an information processing system.

FIG. 2 shows the information processing system 100. The information processing system 100 includes a main system 200, a sub-system 400, and an operation input device 120. The operation input device 120 is an input interface device that allows a user to make an operation input to the main system 200 or the sub-system 400. The operation input device 120 shown in FIG. 2 has a communication section and wirelessly transmits the operation input. However, an input interface device connected to the main system 200 or the sub-system 400 by a cable may be used. The operation input device 120 of the present embodiment has a function to wirelessly connect to the main system 200 or the sub-system 400 by using the Bluetooth (registered trademark) protocol. The operation input device 120 always functions as a slave and therefore cannot simultaneously communicate with both of the main system 200 and the sub-system 400.

The main system 200 includes a main device 220 that processes content and an output device 210 that outputs a processing result by the main device 220. The output device 210 may be a television having a display to output images and a speaker to output sounds. The output device 210 may be connected to the main device 220 by a wired cable or may be wirelessly connected by a wireless LAN (Local Area Network) or the like. The main device 220 is communicably connected to the server system 10 and the terminal devices 14, which connect to the network 12, via a router.

The sub-system 400 includes a sub-device 420 that holds information (e.g. image or text) relating to content held by the main device 220 and an output device 410 that outputs a processing result by the sub-device 420. The output device 410 is a display that outputs images and text and may have an audio output function. The output device 410 may be connected to the sub-device 420 by a wired cable or may be wirelessly connected by a wireless LAN (Local Area Network) or the like. In the present embodiment, it is preferable for the output device 410 to be a display having low power consumption even when being always powered on and be a small-size display of e.g. about 7 to 12 inches. The sub-device 420 makes the output device 410 display icons of pieces of content accumulated in the main device 220. Moreover, regarding content downloaded by the speculative download, the sub-device 420 may make the output device 410 display an advertisement recommending use thereof.

The main device 220 and the sub-device 420 have a function to wirelessly connect to the operation input device 120 by using the Bluetooth protocol. The main device 220 and the sub-device 420 can communicate with each other. They may wirelessly connect by using the Bluetooth protocol or connect in a wired manner by a cable.

The main device 220 is a game device that executes a game application and may be one having a function to reproduce video and music. In this case, the operation input device 120 is a game controller that inputs operation information of a game. In reproduction of video or music, a user operates reproduction processing by using the game controller. The main device 220 may be an information processing device that can process not only the game but other kinds of content.

Furthermore, although the output device 410 as a small-size display is included in the sub-system 400 in the information processing system 100 shown in FIG. 2, the small-size display may be provided on the operation input device 120. For example, the operation input device 120 may be configured as an input interface device of a touch panel type. Furthermore, content icons may be transmitted thereto from the sub-device 420 and the content icons may be displayed on the display. Furthermore, when the operation input device 120 is a game controller, the small-size display may be provided on part of the surface of the controller chassis.

Figure 3:
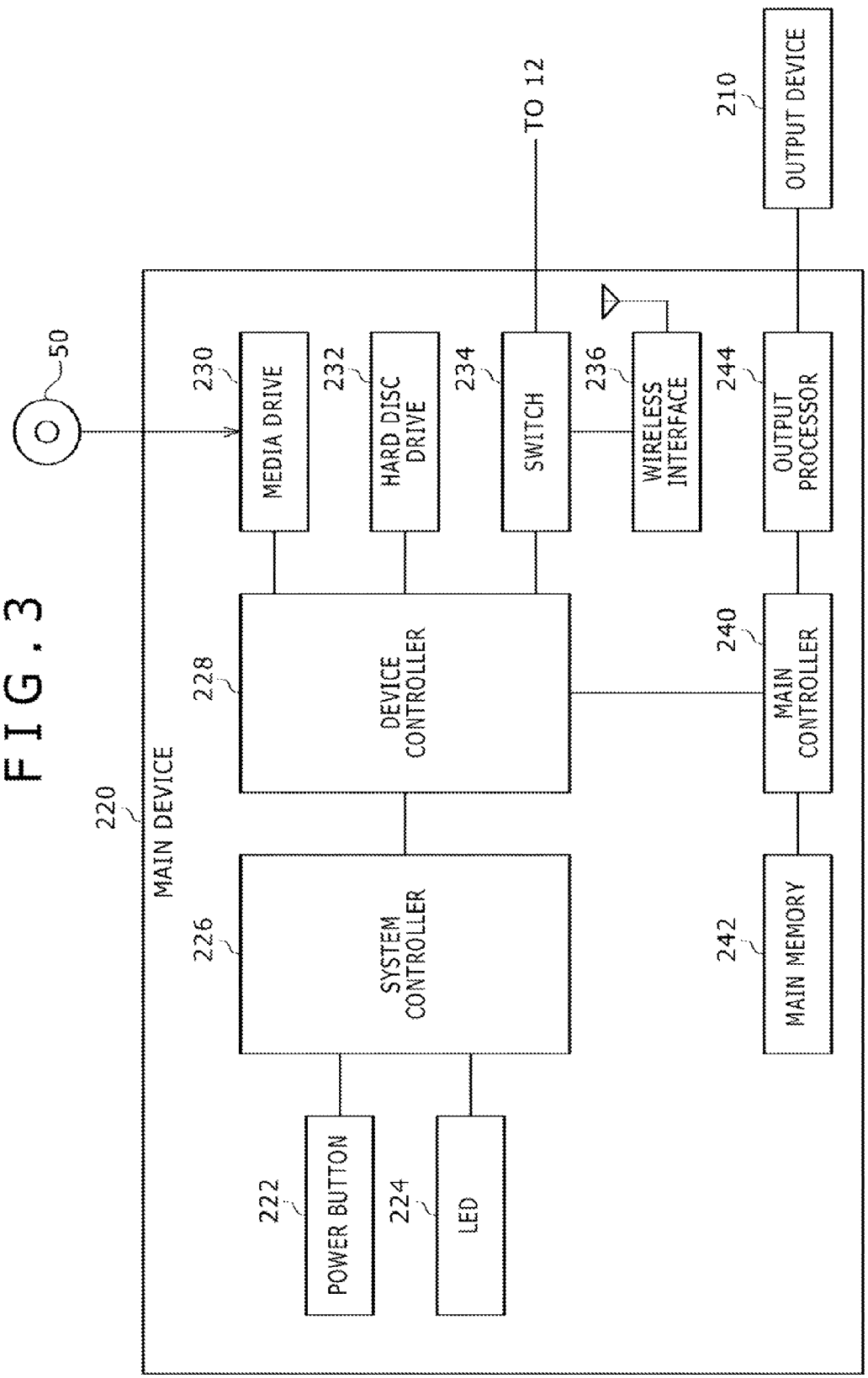
FIG. 3 is a diagram showing the hardware configuration of a main device.

FIG. 3 shows the hardware configuration of the main device 220. The main device 220 is so configured as to have a power button 222, an LED 224, a system controller 226, a device controller 228, a media drive 230, a hard disc drive 232, a switch 234, a wireless interface 236, a main controller 240, a main memory 242, and an output processor 244.

The power button 222 is operated to turn on or off the power supply to the main device 220 by the user. The LED 224 indicates the power-on or -off state by lighting. The system controller 226 detects the pressed state or non-pressed state of the power button 222. When detecting the state transition from the power-off state to the pressed state, the system controller 226 activates the maim controller 240 to launch the boot sequence of an operating system and controls the LED 224 to light it. In the present embodiment, the power of the main device 220 is turned on by an activation (powered on) instruction from the sub-device 420 besides pressing operation of the power button 222 by the user. When receiving the activation instruction from the sub-device 420, the system controller 226 activates the main controller 240 similarly to the case in which pressing operation of the power button 222 is made. If a power cable is plugged in the main device 220, the system controller 226 keeps the standby mode even in the power-off state and monitors pressing operation of the power button 222 and the arrival of the activation instruction from the sub-device 420.

The device controller 228 is configured as an LSI (Large-Scale Integrated Circuit) that executes transfer of information between devices like a southbridge. As shown in the diagram, to the device controller 228, devices such as the system controller 226, the media drive 230, the hard disc drive 232, the switch 234, and the main controller 240 are connected. The device controller 228 absorbs difference in the electrical characteristics and difference in the data transfer rate among the respective devices and controls the timing of data transfer. The hard disc drive 232 drives a built-in hard disc to write/read data. The hard disc drive 232 functions as a storage device to store data. However, another high-capacity storage device other than the hard disc may be used. When a recording medium 50 is loaded in the media drive 230, the media drive 230 drives and recognizes the recording medium 50 to read out the necessary data from the recording medium 50. The recording medium 50 may be a medium such as an optical disc or a magnetooptical disc.

The switch 234 is an Ethernet switch (Ethernet is a registered trademark) and is a device that connects to an external device in a wired or wireless manner to transmit and receive data. The switch 234 receives content data from the server system 10 and/or the terminal device 14 via the network 12. Furthermore, the switch 234 connects to the wireless interface 236 and the wireless interface 236 connects to devices such as the sub-device 420 and the operation input device 120 by the Bluetooth protocol. Basically, information from these devices is supplied to the main controller 240 via the wireless interface 236, the switch 234, and the device controller 228.

When being supplied with power, the main controller 240 executes an operating system (hereinafter, referred to simply as "OS (Operating System)") to carry out overall control of the whole device. Under the OS environment, the main controller 240 executes content processing and so forth according to an operation input by the user supplied from the operation input device 120. The main controller 240 includes a memory controller that connects to the main memory 242. The main memory 242 is formed as a RAM (Random Access Memory).

The output processor 244 is connected to the output device 210 and outputs a video signal and an audio signal as a content processing result. The output processor 244 includes a GPU (Graphics Processing Unit) to implement an image processing function. The GPU may employ the HDMI (High Definition Multimedia Interface).

In the main device 220 of the present embodiment, various pieces of content such as game content, video content, and music content are stored in the hard disc drive 232. These pieces of content may be pieces downloaded from the server system 10 or may be pieces acquired from the recording medium 50.

In the following, functional blocks of the main device 220 and the sub-device 420 will be shown and the operation of the main device 220 and the sub-device 420 will be described.

Figure 4:
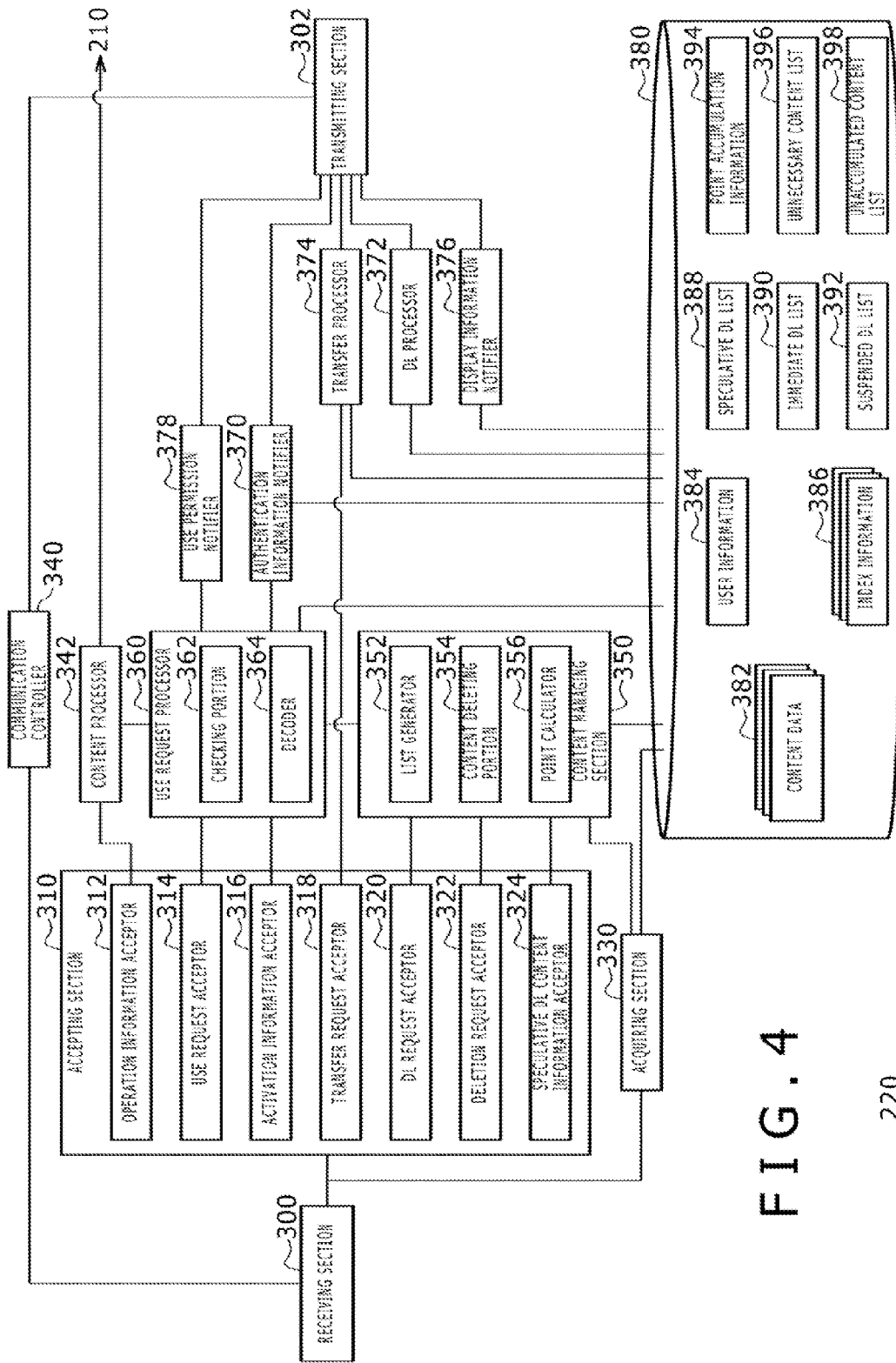
FIG. 4 is a diagram showing functional blocks of the main device.

FIG. 4 shows the functional blocks of the main device 220. The main device 220 includes a receiving section 300, a transmitting section 302, an accepting section 310, an acquiring section 330, a communication controller 340, a content processor 342, a content managing section 350, a use request processor 360, an authentication information notifier 370, a download (DL) processor 372, a transfer processor 374, a display information notifier 376, a use permission notifier 378, and a storage device 380. The receiving section 300 and the transmitting section 302 form a communication section. The accepting section 310 has an operation information acceptor 312, a use request acceptor 314, an activation information acceptor 316, a transfer request acceptor 318, a DL request acceptor 320, a deletion request acceptor 322, and a speculative DL content information acceptor 324. The content managing section 350 has a list generator 352, a content deleting portion 354, and a point calculator 356. The use request processor 360 has a checking portion 362 and a decoder 364. When content processing and download processing are not executed, the main device 220 is in the power-saving mode but monitors the arrival of an activation instruction transmitted from the sub-device 420.

The functions of the main device 220 are implemented by the system controller 226 shown in FIG. 3, the switch 234, the wireless interface 236, the main controller 240, the output processor 244, the main memory 242, a program loaded in the main memory 242, and so forth and functional blocks implemented by cooperation of them are drawn here. It is understood by those skilled in the art that these functional blocks can be implemented in various forms by only hardware, only software, or a combination of them.

Figure 5:
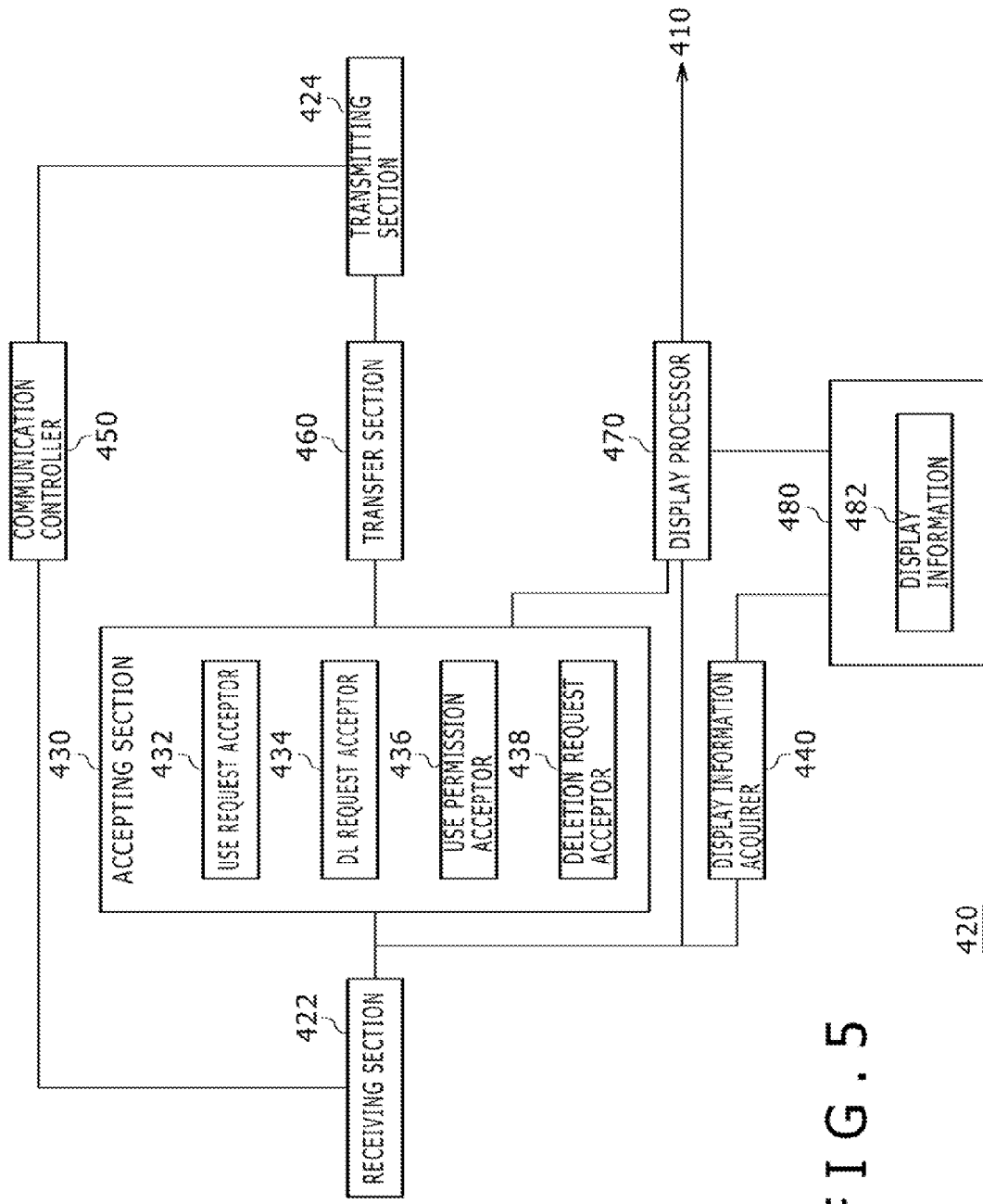
FIG. 5 is a diagram showing functional blocks of a sub-device.

FIG. 5 shows the functional blocks of the sub-device 420. The sub-device 420 includes a receiving section 422, a transmitting section 424, an accepting section 430, a display information acquirer 440, a communication controller 450, a transfer section 460, a display processor 470, and a storage device 480. The receiving section 422 and the transmitting section 424 form a communication section. The accepting section 430 has a use request acceptor 432, a DL request acceptor 434, a use permission acceptor 436, and a deletion request acceptor 438.

The functions of the sub-device 420 shown in FIG. 5 are implemented by a CPU, a memory, a program loaded in the memory, and so forth and functional blocks implemented by cooperation of them are drawn here. It is understood by those skilled in the art that these functional blocks can be implemented in various forms by only hardware, only software, or a combination of them.

In the information processing system 100 of the present embodiment, the output device 410 and the sub-device 420 in the sub-system 400 are always in the state of being powered on. The output device 410 displays content identifying information such as image or text relating to content accumulated in the main device 220.

Figure 6:
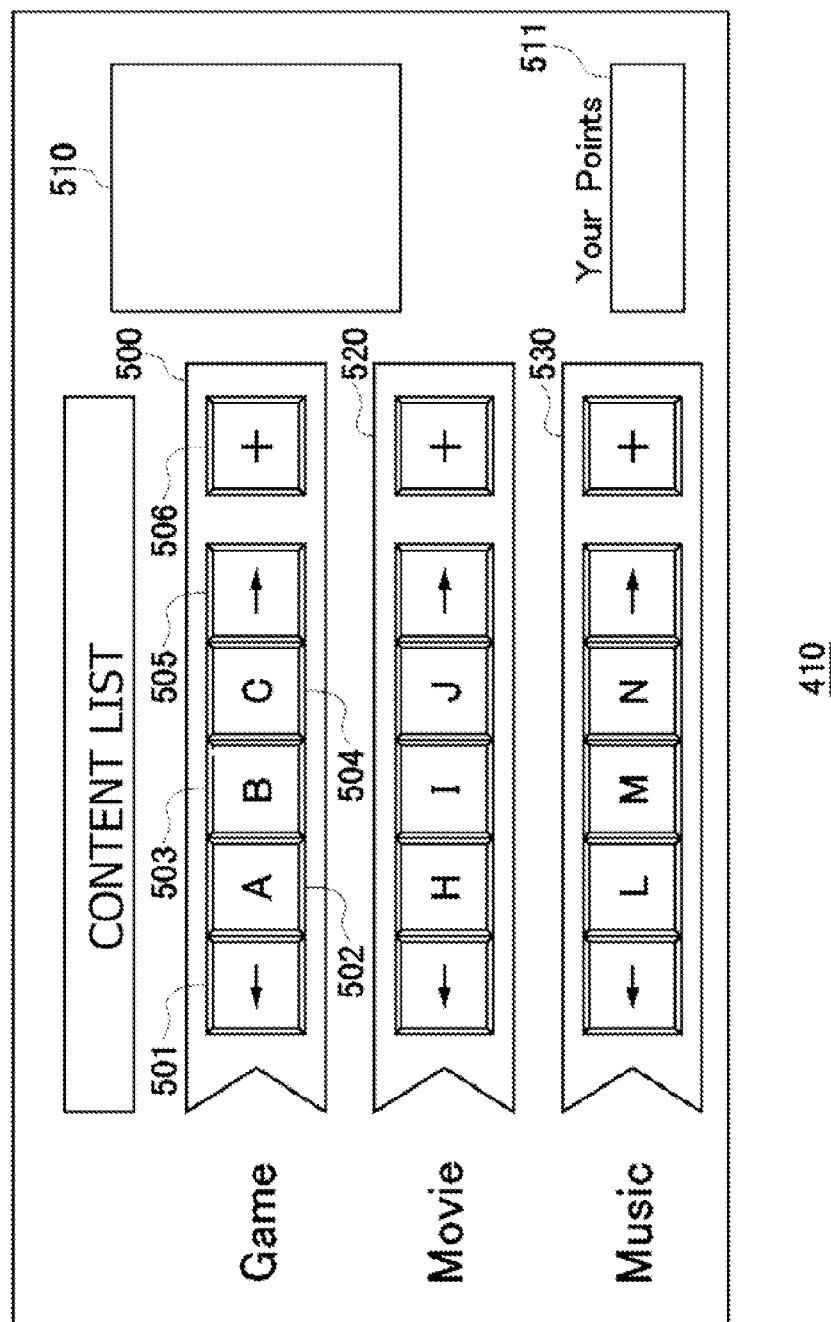
FIG. 6 is a diagram showing a screen configuration example of content lists displayed on a small-size display of an output device.

FIG. 6 shows a screen configuration example of content lists displayed on the small-size display of the output device 410. In the content list display screen, a game list display area 500 in which a list of accumulated games is displayed, a movie list display area 520 in which a list of accumulated movies is displayed, and a music list display area 530 in which a list of accumulated pieces of music is displayed are formed. For example, in the game list display area 500, icons 502, 503, and 504 of accumulated games are displayed and arrow keys 501 and 505 for scrolling the icons of accumulated games are set. In the content list display screen, a cursor operable by the operation input device 120 is prepared. The user can use content associated with an icon by operating the operation input device 120 to dispose the cursor on the desired icon and carrying out predetermined operation (e.g. pressing operation of a predetermined button of the operation input device 120). When accepting a use request by the user, the sub-device 420 transmits an activation instruction to the main device 220 to activate the main device 220 and then transmits the use request to the main device 220, which will be described later.

In a display area 510, an image relating to content currently processed in the main device 220 is displayed. For example, the displayed image may be an icon of the content or may be a package image of the content. In a point area 511, points acquired by the user are displayed. In the present embodiment, points are given from the server system 10 when the suspended download is selected. In the content distribution system 1, a user may be given points also in other scenes and points may be given at the time of content recycle to be described later. In the point area 511, the number of accumulated points is displayed.

When the cursor is disposed on an icon 506 indicated by "+" and a predetermined operation input is made by the operation input device 120, a list of pieces of unaccumulated game content is displayed. Because the output device 410 is the small-size display whereas the number of pieces of unaccumulated game content is numerous, it is preferable that lists categorized by game genre are displayed for example. The user selects content desired to be downloaded among the lists and thereby a download request is generated. A list of pieces of unaccumulated movie content is displayed when the "+" icon in the movie list display area 520 is specified, and a list of pieces of unaccumulated music content is displayed when the "+" icon in the music list display area 530 is specified.

FIG. 7 shows one example of a download mode selection screen displayed on the output device 410 when a user selects unaccumulated content. In this example, the user requests download of a game XYZ as unaccumulated content and the sub-device 420 makes the output device 410 display a screen to prompt the user to select either the immediate download or the suspended download as the download mode. In FIG. 7, "downloaded immediately" corresponds to the immediate download and "downloaded later" corresponds to the suspended download. The user decides the download mode by selecting either of two check boxes.

As a premise of the above, the operation input device 120 and the sub-device 420 wirelessly connect by the Bluetooth protocol. The sub-device 420 functions as a parent device, i.e. a master, and the operation input device 120 functions as a child device, i.e. a slave. As described later, the sub-device 420 wirelessly connects to the main device 220 by using the Bluetooth protocol at this time. The sub-device 420 functions as a master over the main device 220 and the main device 220 functions as a slave. The communication system by the Bluetooth protocol will be described below.

Figure 8:
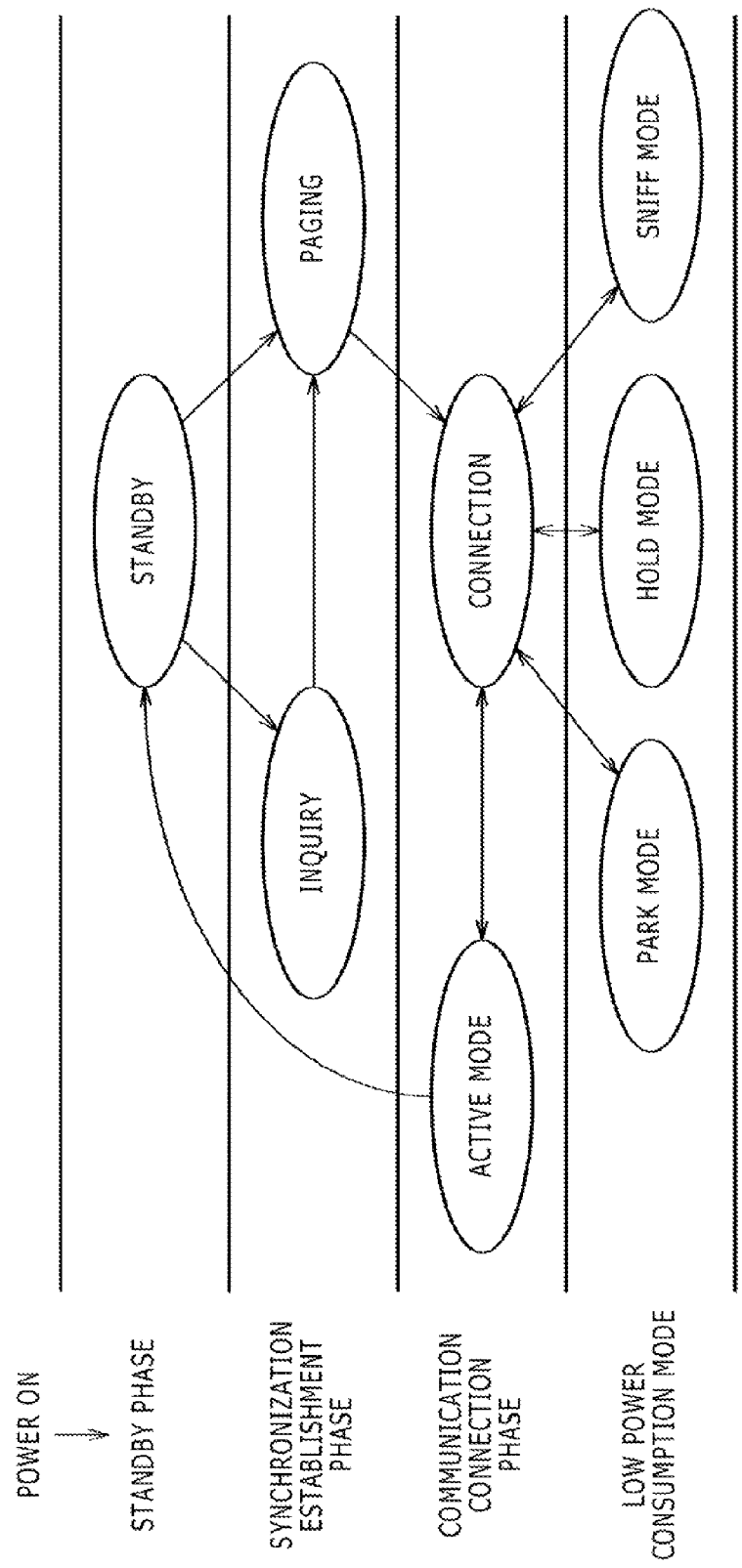
FIG. 8 is a diagram showing a state transition diagram of the Bluetooth.

FIG. 8 shows a state transition diagram of the Bluetooth. As shown in the diagram, the state of the Bluetooth terminal can be classified into standby phase, synchronization establishment phase, communication connection phase, and low power consumption mode.

Immediately after the operation input device 120 is powered on or when a communication link of the operation input device 120 is disconnected, the operation input device 120 enters the "standby" state. Furthermore, when a communication link of the main device 220 is disconnected, the main device 220 enters the "standby" state. In the "standby" state, transmission and reception of data are not performed. In the following, the state transition between the sub-device 420 and the operation input device 120 will be described. However, the state transition between the sub-device 420 and the main device 220 is also the same and description thereof is omitted.

In the synchronization establishment phase, there are the state in which the sub-device 420 makes a connection inquiry, i.e. "inquiry," to terminal devices including the peripheral operation input device 120 and the state in which the sub-device 420 recognizes the operation input device 120 and carries out "paging." In the "inquiry" state, the sub-device 420 broadcasts an IQ (inquiry) packet to terminal devices in vicinity. The operation input device 120 that has received the IQ packet returns an FHS (Frequency Hop Synchronization) packet including Bluetooth address and clock information to the sub-device 420. In the FHS packet, LAP (Lower Address Part), UAP (Upper Address Part), and NAP (Non-significant Address Part) configure Bluetooth ADDR, which is the address unique to the Bluetooth terminal. In the transmission and reception at this timing, consent relating to the frequency hopping pattern is not established between the sub-device 420 and the operation input device 120 and thus a fixed hopping pattern defined exclusively for the inquiry is used.

In the "paging" state, the sub-device 420 transmits an ID packet to the operation input device 120 after receiving the FHS packet from the operation input device 120 and grasping the existence of the operation input device 120. When a reply to the ID packet returns from the operation input device 120, the sub-device 420 transmits an FHS packet to the operation input device 120 to inform the operation input device 120 of its own address and clock. This makes it possible for the sub-device 420 and the operation input device 120 to share the same hopping pattern.

When "paging" is carried out, a piconet is formed between the sub-device 420 and the operation input device 120 and they enter the "connection" state. The piconet means a network temporarily formed between terminals when Bluetooth terminals are brought close to each other. In one piconet, the sub-device 420 functions as a parent device. After the start of the "connection" state, control packets for communication link setting are transmitted and received, which enables "data transfer." When the data transfer is completed and the communication link is disconnected, the operation input device 120 returns to the standby state.

The operation input device 120 as the slave can make transition from the connection state to three kinds of low power consumption modes, i.e. "park mode," "hold mode," and "sniff mode." Furthermore, the sub-device 420 as the master can make transition from the connection state to the "hold mode."

The operation input device 120 in the "park mode" holds the synchronization with the piconet, i.e. the synchronization with the hopping pattern and the master clock. However, it cannot exchange packets with the sub-device 420. The operation input device 120 in this state receives data from the sub-device 420 at a certain time interval (beacon cycle) and can immediately participate in the piconet if necessary. In the park mode, the operation input device 120 returns the slave identifier allocated from the sub-device 420, i.e. 3-bit address (1 to 7) given to a Bluetooth terminal being currently connected, to the sub-device 420. Therefore, even when desiring to participate in the piconet again, the operation input device 120 cannot immediately participate in it unless there is a vacancy in the slave identifier. Conversely, the sub-device 420 gives a park slave identifier of 8 bits to a Bluetooth terminal that enters the park mode. The sub-device 420 can allow only the necessary Bluetooth terminal to participate in the piconet as needed.

The operation input device 120 and the sub-device 420 in the "hold mode" do not perform transmission and reception during a set certain time (hold time) while remaining synchronized with the piconet, and resumes communication after the hold time.

The operation input device 120 in the "sniff mode" performs transmission and reception at a certain time interval (sniff interval) and can suppress the power consumption in the other time.

In the present embodiment, when the operation input device 120 that has entered the standby state after communication ended once performs communication again, transition to the paging state can be made with skipping of the inquiry. Because having already gotten to know the existence of the operation input device 120, the sub-device 420 talks to the operation input device 120 in a one-to-one manner by paging and establishes synchronization in a piconet. Once the synchronization in the piconet is established, there is no need to execute broadcasting at the time of resumption of communication even when the operation input device 120 is in the standby state after the end of communication. Because execution of the broadcasting takes e.g. 10 seconds or longer in some cases, the inquiry is omitted in the present embodiment to shorten the time it takes to establish a connection. "Establish synchronization in a piconet" means that the Bluetooth address and clock information are exchanged between the sub-device 420 and the Bluetooth terminal to synchronize the hopping pattern.

The sub-device 420 records the identification information of the operation input device 120 acquired in connection establishment. The identification information of the operation input device 120 is used in connection establishment of the next and subsequent times in order to shorten the time it takes to establish a connection.

In the present embodiment, the sub-device 420 serving as a master records the identification information of the operation input device 120 and the main device 220 existing in vicinity and thereby can perform paging when needed. Furthermore, the operation input device 120 and the main device 220 serving as a slave may make transition to e.g. the "park mode" after the end of the connection state so that they can connect to the sub-device 420 when needed.

Although the communication connection when the sub-device 420 functions as a master is described above, the main device 220 functions as a master in some cases in the information processing system 100 of the present embodiment as described later. Therefore, the main device 220 also executes the same wireless connection establishment processing as the above-described processing of the sub-device 420 in advance and records the identification information of Bluetooth terminals existing in vicinity, i.e. the operation input device 120 and the sub-device 420. This makes it possible to early establish a connection to the operation input device 120 and the sub-device 420 existing in vicinity when the main device 220 functions as a master.

With reference to FIGS. 4 and 5, processing of downloading content based on a request by a user will be described below.

<Content Download Based on User Request>

In the sub-device 420, the communication controller 450 controls communication with the operation input device 120 and the main device 220 as a master. When the user operates the operation input device 120, the receiving section 422 receives operation information and the display processor 470 moves a cursor on a content list display screen according to the operation information. If the receiving section 422 receives predetermined operation information (selection input) when the cursor is disposed on the icon 506, the display processor 470 makes the output device 410 display a list of pieces of unaccumulated content. The list of pieces of unaccumulated content is included in display information 482 stored in the storage device 480. The displayed content list may be what displays icons of pieces of content or may be what displays the titles of pieces of content. When the receiving section 422 receives the selection input for specific content, the DL request acceptor 434 accepts a download (DL) request for the content.

At this time, the display processor 470 displays the download mode selection screen shown in FIG. 7 on the output device 410. When a selection input made by selecting either mode is transmitted from the operation input device 120, the DL request acceptor 434 accepts the selected mode. Therefore, the content to be downloaded and the download mode are identified. The transfer section 460 generates a download request made by combining content identification information to identify the content and the download mode and supplies it to the transmitting section 424.

The communication controller 450 generates an activation instruction signal for activating the main device 220 in the power-saving mode and makes the activation instruction signal be transmitted before making the download request be transmitted from the transmitting section 424. Upon receiving the activation instruction signal, the main device 220 supplies power to the main controller 240 and so forth to make transition from the power-saving mode to the normal power mode. The output device 210 as the large-size display does not have to be activated. After the activation of the main device 220, the communication controller 450 makes the download request be transmitted from the transmitting section 424. For example, the communication controller 450 may make the download request be transmitted several seconds after the transmission of the activation instruction signal.

In the main device 220, the communication controller 340 controls the communication with the sub-device 420 as a slave. The receiving section 300 receives the download request and the DL request acceptor 320 accepts the download request. The download request is supplied to the content managing section 350 and the list generator 352 generates a download list in accordance with the download request.

The storage device 380 holds, as the download lists, a speculative DL list 388, an immediate DL list 390, and a suspended DL list 392 generated by the list generator 352. The speculative DL list 388 is a list of content as the target of the speculative download. The immediate DL list 390 is a list of content as the target of the immediate download. The suspended DL list 392 is a list of content as the target of the suspended download. In the main device 220, the DL processor 372 executes download processing based on these download lists.

Specifically, the list generator 352 refers to the download mode included in the download request and adds the content identification information to the corresponding download list. In this case, the download mode is either the immediate download or suspended download mode and the list generator 352 reads out the download list corresponding to the download mode from the storage device 380 to register the content identification information included in the download request in the download list.

Upon updating the download list, the list generator 352 notifies this to the DL processor 372. When the download list is updated, the DL processor 372 performs scheduling of the download processing. The DL processor 372 may periodically check the download lists to check whether or not they are updated.

Specifically, when content identification information is registered in the immediate DL list 390, the DL processor 372 immediately executes the download processing of the content. The DL processor 372 generates a download request and the transmitting section 302 transmits the download request to the server system 10.

When content identification information is registered in the suspended DL list 392, the DL processor 372 sets the time of start of the download processing of the content. For example, the start time may be set in a time zone in which the content processor 342 does not execute content processing and that is from 0 a.m. to 5 a.m. The DL processor 372 generates a download request including information indicating that this download is the suspended download and the transmitting section 302 transmits the download request to the server system 10 at the scheduled time. Upon receiving the information indicating that this download is the suspended download, the server system 10 transmits content to the main device 220 and gives predetermined points to the user. The server system 10 accumulates the given points and manages the points.

In the suspended download mode, the transmitting section 302 may transmit the download request to another terminal device 14. In the case of transmitting it to another terminal device 14, content is downloaded by P2P communication. In the case of downloading content by P2P communication, the transmitting section 302 notifies the server system 10 of information indicating that the suspended download is carried out for point acquisition. This allows the server system 10 to give points to the user. The timing of the point giving may be the time when the server system 10 is notified of the completion of the download by P2P communication from the main device 220.

When the server system 10 or the terminal device 14 transmits content data, the receiving section 300 receives it and the acquiring section 330 acquires the content data to store it in the storage device 380 as content data 382. Although the acquiring section 330 and the DL processor 372 are shown by separate functional blocks in FIG. 4, both may configure the DL processor in cooperation. The list generator 352 determines that the download is completed and deletes the identification information of the downloaded content from the corresponding download list. Furthermore, the acquiring section 330 acquires also index information 386 of the content together with the content and stores it in the storage device 380. In the index information 386, the content name, icon data, and so forth are included. The content name and the icon data are used by the main device 220 for generation of a menu screen of content and so forth. In addition, they are used also when the sub-device 420 generates the content list display screen.

For example, the following data are included in the index information.
(1) Content ID
   This is a number to identify content.
(2) Content Name
   This is the title of content.
(3) Category
   This is information indicating the type of content. For example, a category of game, movie, or music is set.
(4) Icon Data
   This is a thumbnail image or moving image of content.
(5) Text Option
   This is a pop-up message added to the content list display screen.
(6) Download Start Date and Time
   This is date and time when download is started.
(7) Download End Date and Time
   This is date and time when download is ended. It is also date and time when accumulation is started.
(8) Expiration Date
   This is the time limit of accumulation of content data downloaded by the speculative download. The expiration date is not set for content data downloaded by the immediate download or the suspended download.
(9) Time Limit of Recycle
   This is the time limit of recycle of content data downloaded by the speculative download. A period longer than the expiration date is set. The time limit of recycle is not set for content data downloaded by the immediate download or the suspended download.
(10) Activation Check Flag
   This is a flag indicating whether or not activation processing has been executed.

The server system 10 holds the index information 386 in synchronization with the information processing system 100. Therefore, the server system 10 always monitors and grasps the content held by the main device 220. The display information notifier 376 makes the transmitting section 302 transmit, to the sub-device 420, display information to be used for generation of the content list display screen in the sub-device 420 in the index information 386. It is preferable for the display information notifier 376 to notify the sub-device 420 of the display information every time a change such as modification, addition, or deletion is made in the index information 386.

When content is downloaded by the suspended download, the acquiring section 330 acquires predetermined points. The storage device 380 stores point accumulation information 394 made by accumulating past points. When the acquiring section 330 acquires points, the point calculator 356 reads out the point accumulation information 394 and adds the newly acquired points to it to register the addition result as the point accumulation information 394. When the point accumulation information 394 is updated, the display information notifier 376 makes the point accumulation information 394 be transmitted from the transmitting section 302 to the sub-device 420 as the display information in the sub-system 400. The accumulated points are managed also by the server system 10 and the acquiring section 330 may acquire the accumulated points from the server system 10 to save it in the storage device 380 as the point accumulation information 394.

In the sub-device 420, the receiving section 422 receives the display information transmitted from the main device 220 and the display information acquirer 440 acquires the display information to store it in the storage device 480. The display information 482 is the icon data and content name of accumulated content as described above and includes also the point accumulation information 394. The display processor 470 forms the content list display screen shown in FIG. 6 by using the updated display information 482.

The main device 220 acquires an unaccumulated content list 398 from the server system 10 and transmits it to the sub-device 420 as display information. The unaccumulated content list 398 is updated every time the main device 220 downloads content or new content becomes available. Due to this, the unaccumulated content list can be displayed on the output device 410 when the icon 506 shown in FIG. 6 is selected.

Figure 9:
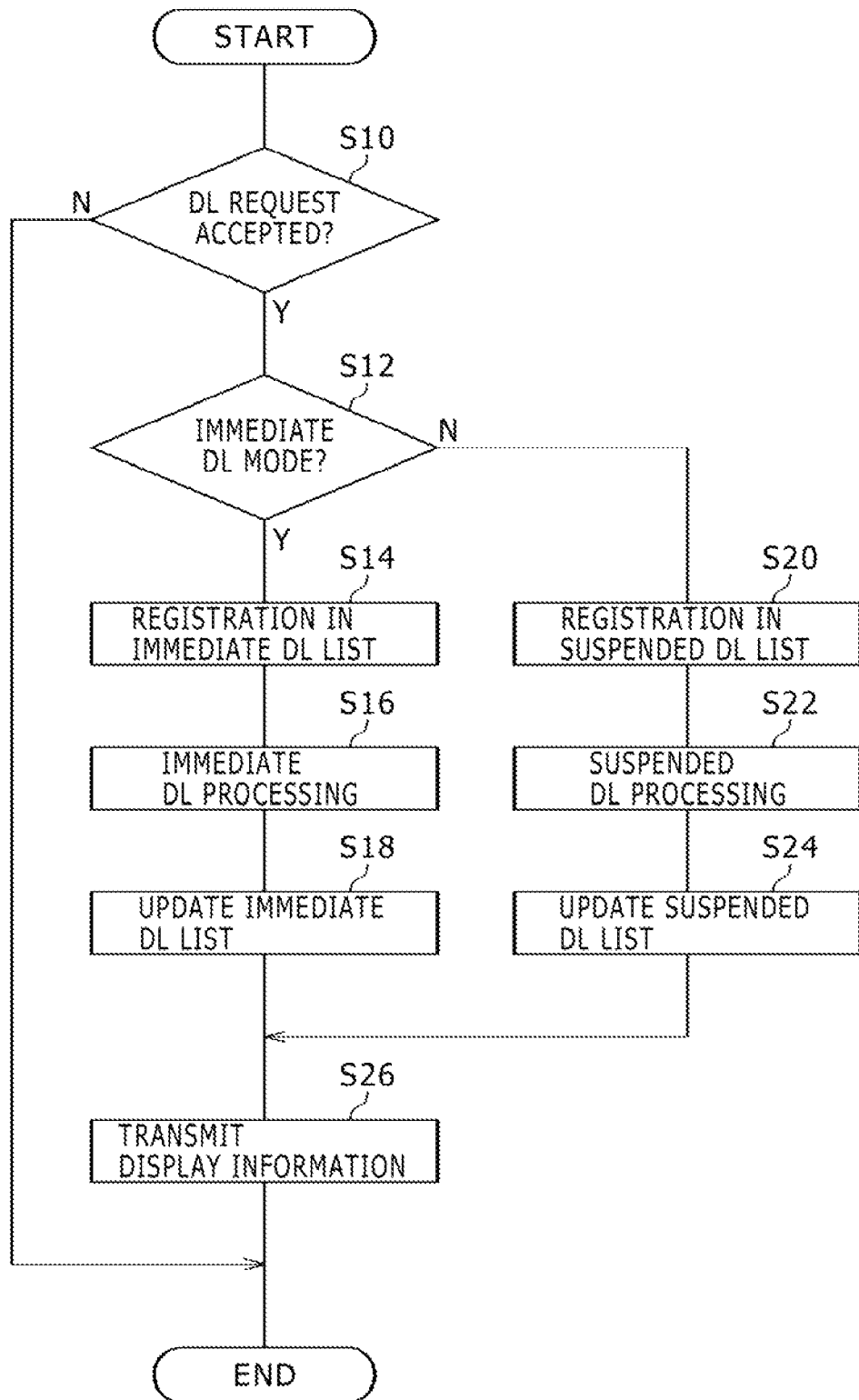
FIG. 9 is a diagram showing download processing based on a user request.

FIG. 9 shows download processing by a user request. If the DL request acceptor 320 accepts a download request from the sub-device 420 (Y of S10), the list generator 352 determines the mode included in the download request (S12). If the download request is not accepted (N of S10), this processing ends. In the case of the immediate download mode (Y of S12), the list generator 352 registers content identification information included in the download request in the immediate DL list 390 (S14). The DL processor 372 generates a download request including the content identification information registered in the immediate DL list 390 and transmits the download request to the server system 10. When the content identification information is registered in the immediate DL list 390, the DL processor 372 immediately makes the download request be transmitted from the transmitting section 302 to the server system 10 to thereby execute immediate download processing (S16). The acquiring section 330 acquires content and index information. When the download processing is completed, the list generator 352 deletes the corresponding content identification information from the immediate DL list 390 to update the immediate DL list 390 (S18). The display information notifier 376 notifies the sub-device 420 of the display information to be used for generation of the content list display screen in the sub-system 400 (S26).

On the other hand, if the download mode is not the immediate download mode (N of S12), the list generator 352 registers the content identification information included in the download request in the suspended DL list 392 (S20). When the content identification information is registered in the suspended DL list 392, the DL processor 372 decides the time of start of download processing of the content. The DL processor 372 generates a download request including the content identification information registered in the suspended DL list 392 and information indicating that this download is the suspended download and makes the download request be transmitted from the transmitting section 302 to the server system 10 or the terminal device 14 at the scheduled time to thereby execute suspended download processing (S22). The acquiring section 330 acquires content, index information, and points. When the download processing is completed, the list generator 352 deletes the corresponding content identification information from the suspended DL list 392 to update the suspended DL list 392 (S24). The display information notifier 376 notifies the sub-device 420 of the display information to be used for generation of the content list display screen in the sub-system 400 (S26).

Next, description will be made about processing of speculative download of content selected by the server system 10 according to the preference of a user and so forth.

<Content Download Irrespective of User Request>

In the speculative download mode, the server system 10 picks out recommended content to be downloaded by the user and notifies it to the information processing system 100. The information processing system 100 downloads the recommended content at appropriate timing. If the server system 10 detects e.g. a purchase history of a game of a series from user information held in synchronization with the information processing system 100, the server system 10 picks out the game of the latest version as recommended content when this game is released for sale. Furthermore, when a sequel of a movie purchased in the past is released, the server system 10 may pick out it as recommended content.

In the speculative download mode, various pieces of content are downloaded irrespective of a request from the user. Therefore, there is an advantage that, if the user wants to use the content, the user can immediately use it without the need to execute download processing anew. The content fee is incurred not at the time of download but at the time of use. This can realize a favorable use environment of content without imposing a disadvantage on the user.

Figure 10:
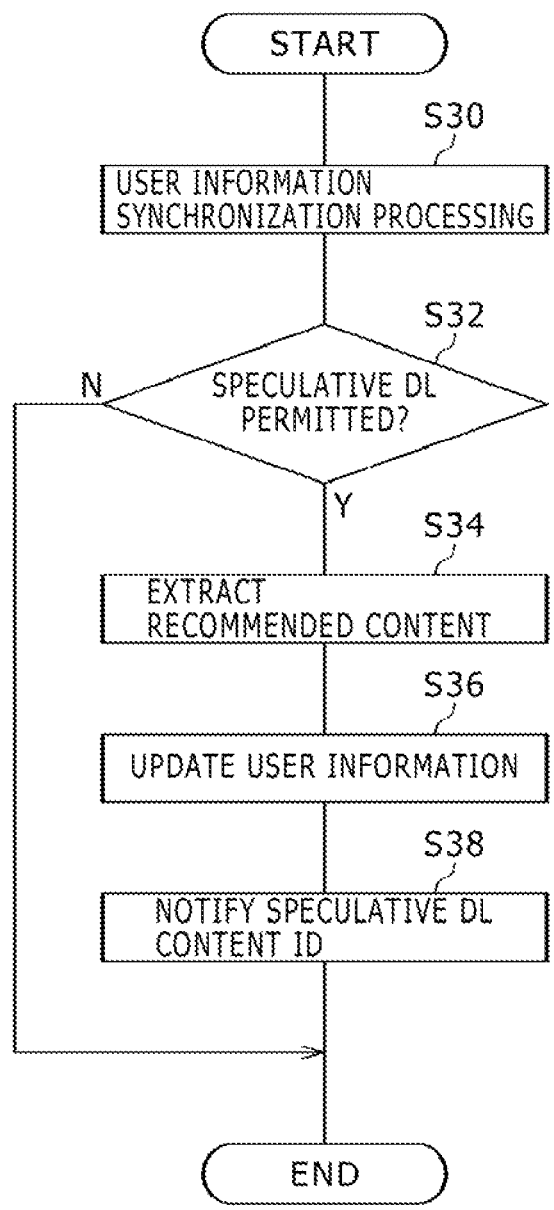
FIG. 10 is a diagram showing processing of extraction of recommended content in a server system.

FIG. 10 shows processing of extraction of recommended content in the server system 10. The server system 10 periodically executes synchronization processing of user information with the information processing system 100 (S30). For example, the following data are included in the user information.

(1) User ID

This is a number to identify the user.

(2) Speculative download permission flag

This is set by the user and indicates information on whether or not to permit the speculative download.

(3) Recycle permission flag

This is set by the user and indicates information on whether or not to permit recycle of content.

(4) Content information

This indicates information on content purchased in the past, content downloaded by the speculative download, and so forth.

(5) User's preference information

This indicates information on content genre and category favored by the user. It may be set by the user or may be set by the server system 10.

The server system 10 refers to the value of the speculative download permission flag included in the user information and determines whether the speculative download is permitted (S32). If it is not permitted (N of S32), the extraction processing of recommended content is not executed. If it is permitted (Y of S32), the server system 10 extracts recommended content based on information on the preference of the user, the past purchase history, and so forth (S34). In this extraction processing, e.g. popular content, content particularly recommended by the operating body of the content distribution server, etc. may be extracted. The server system 10 adds information on the content extracted as a speculative download candidate to the content information of the user information (S36). The server system 10 notifies the information processing system 100 of the information on the extracted content (e.g. identification information) (S38).

When, in the main device 220, the receiving section 300 receives the identification information of speculative download content and the speculative DL content information acceptor 324 accepts it, the list generator 352 reads out the speculative DL list 388 from the storage device 380 and adds the content identification information to it to update the list.

Upon updating the speculative DL list 388, the list generator 352 notifies this to the DL processor 372. When the speculative DL list 388 is updated, the DL processor 372 performs scheduling of the download processing. The DL processor 372 may periodically check the speculative DL list 388 to check whether or not it is updated.

When the content identification information is registered in the speculative DL list 388, the DL processor 372 sets the time of start of the download processing of the content. At this time, the DL processor 372 refers to the suspended DL list 392 and performs the scheduling in such a manner as to preferentially execute the suspended download if content to be downloaded by the suspended download exists. This is because the speculative download processing is executed irrespective of a request by the user and therefore it is preferable to execute the suspended download processing in accordance with a request by the user in first.

Figure 11:
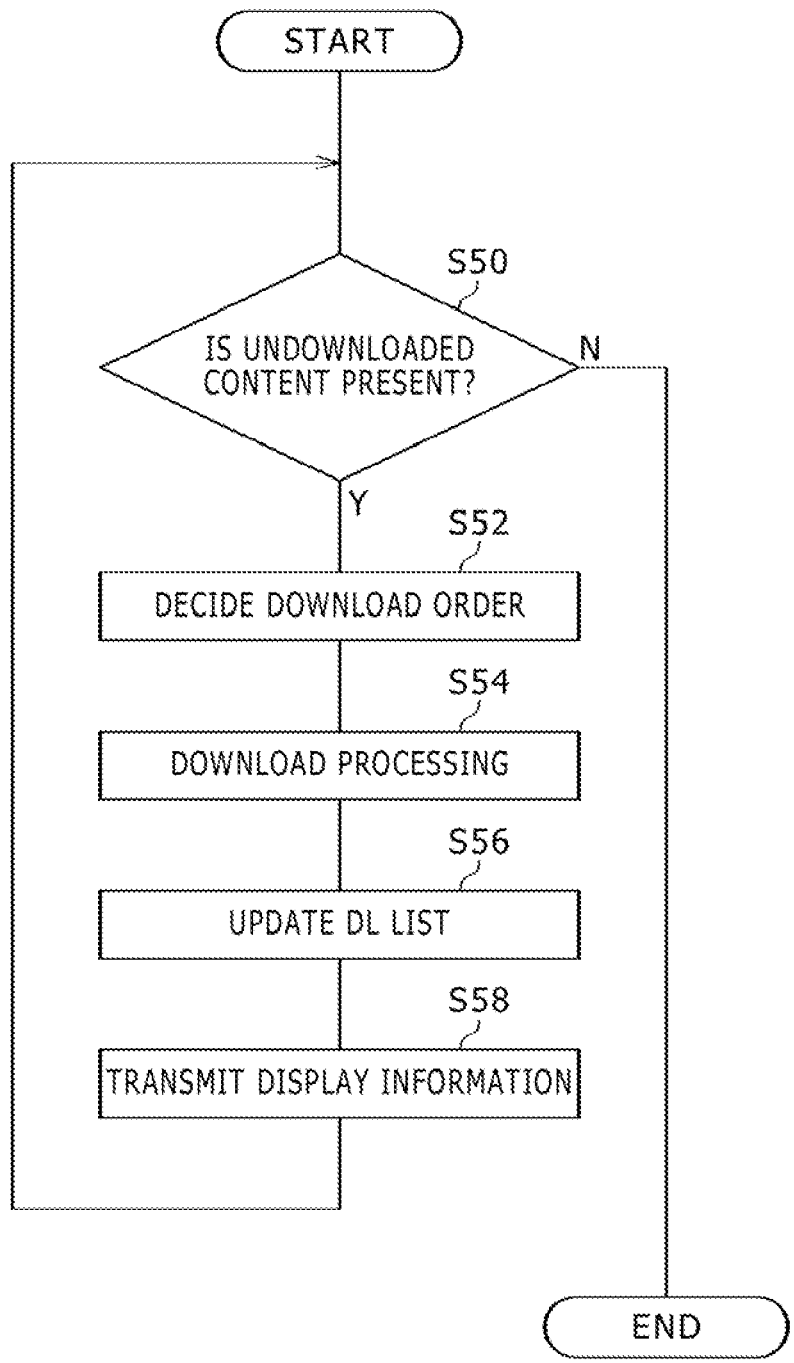
FIG. 11 is a diagram showing suspended download processing and speculative download processing.

FIG. 11 shows the suspended download processing and the speculative download processing. The DL processor 372 refers to the suspended DL list 392 and the speculative DL list 388 and determines whether content whose download has not been completed exists (S50). For example, this determination processing may be periodically executed or may be executed when either the suspended DL list 392 or the speculative DL list 388 is updated. If content identification information is not registered in the suspended DL list 392 and the speculative DL list 388, the DL processor 372 determines that content waiting for being downloaded does not exist (N of S50) and ends the present processing.

If content waiting for being downloaded exists (Y of S50), the DL processor 372 decides the download order (S52). Here, under a policy that the suspended download processing is executed preferentially over the speculative download processing, the DL processor 372 sets the download order of content corresponding to content identification information included in the suspended DL list 392 earlier than the download order of content corresponding to content identification information included in the speculative DL list 388. If plural pieces of content exist as the target of the suspended download, the download order is set in the order in which the download request from the user is generated. Similarly, if plural pieces of content exist as the target of the speculative download, the download order is set in the order in which the content is extracted as recommended content by the server system 10.

In the case of executing the suspended download processing, the DL processor 372 generates a download request including information indicating that this download is the suspended download and makes the download request be transmitted from the transmitting section 302 to the server system 10 or the terminal device 14 at the scheduled time to thereby execute the suspended download processing (S54). Furthermore, in the case of executing the speculative download processing, the DL processor 372 generates a download request including information indicating that this download is the speculative download and makes the download request be transmitted from the transmitting section 302 to the server system 10 or the terminal device 14 at the scheduled time to thereby execute the speculative download processing (S54). The acquiring section 330 acquires also the index information of content together with the content data and stores it in the storage device 380. If points are given, the point calculator 356 stores calculated points in the storage device 380 as the point accumulation information 394.

In the immediate download mode and the suspended download mode, billing processing is executed at the time of the download. Thus, in the speculative download mode, information indicating that the download is the speculative download is made to be included in the download request to thereby prevent billing processing from being executed at the time of the download. When determining that the download request is the speculative download request, the server system 10 does not execute billing processing. As above, because the speculative download processing is not based on a request by a user differently from the other modes, it is preferable that billing processing is executed at the time of activation of content. In the content distribution system 1, it is also possible that billing processing of all pieces of content is executed at the time of activation thereof irrespective of the download mode.

When the download processing is completed, the list generator 352 deletes the identification information of the downloaded content from the corresponding download list to update the download list (S56). The display information notifier 376 notifies the sub-device 420 of the display information to be used for generation of the content list display screen in the sub-system 400 (S58).

The steps of S52 to S58 are carried out until download processing of all pieces of content included in the suspended DL list 392 and the speculative DL list 388 has been completed. The order decision step of S52 can be omitted by using the order set in the first time. Because the suspended download processing has been already described in relation to FIG. 9, details of the speculative download processing will be described below.

When the server system 10 or the terminal device 14 transmits content, the receiving section 300 receives the content and the acquiring section 330 acquires the content to store it in the storage device 380 as the content data 382. At this time, the list generator 352 determines that the download is completed and deletes the identification information of the downloaded content from the speculative DL list 388. Furthermore, the acquiring section 330 acquires also the index information 386 of the content together with the content and stores it in the storage device 380. In the index information 386, the expiration date of the content is included in addition to the content name, icon data, and so forth.

The expiration data is information indicating such a due date that content data is deleted unless activation is carried out until this due date. The content name and icon data are used by the main device 220 for generation of a menu screen of content and so forth. In addition, they are used also when the sub-device 420 generates the content list display screen. The display information notifier 376 makes the transmitting section 302 transmit, to the sub-device 420, display information to be used for generation of the content list screen in the sub-device 420 in the index information 386.

In the sub-device 420, the receiving section 422 receives the display information transmitted from the main device 220 and the display information acquirer 440 acquires the display information to store it in the storage device 480. The display information 482 is the icon data and content name of accumulated content as described above and may include a text option. The display processor 470 forms the content list display screen shown in FIG. 6 by using the updated display information 482.

Figure 12:
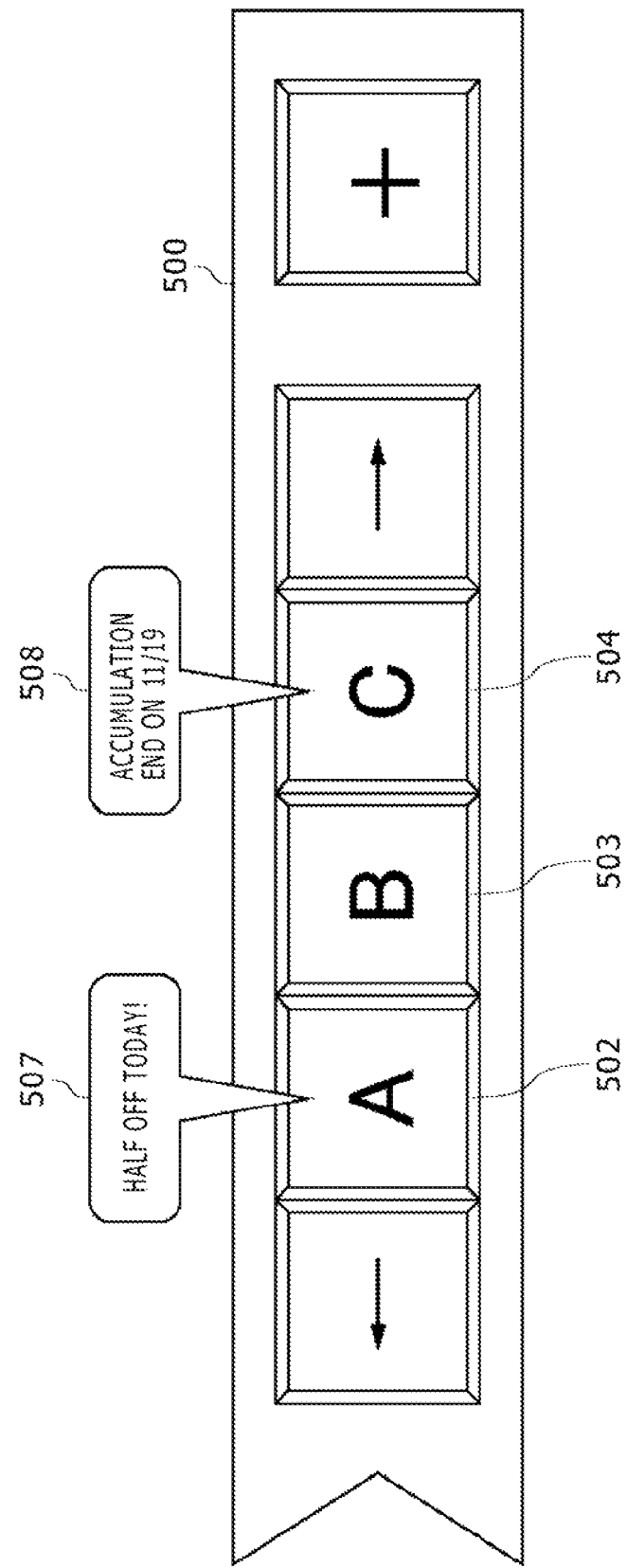
FIG. 12 is a diagram showing a modification example of a game list display area in a content list display screen shown in FIG. 6.

FIG. 12 shows a modification example of the game list display area 500 in the content list display screen shown in FIG. 6. The game icon 503 indicates game content downloaded by the immediate or suspended download and the game icons 502 and 504 indicate game content downloaded by the speculative download. To the game icon 502, explanatory information 507 of "half off today" is added as a pop-up message. This indicates that a game A can be purchased at half the normal price if activation processing is executed this day so that the game A may become available. Furthermore, to the game icon 504, explanatory information 508 of "accumulation end on 11/19" is added as a pop-up message. An expiration date is set for content downloaded by the speculative download and this message indicates that a game B is automatically deleted from the storage device 380 unless activation processing is executed until 11/19.

As above, it is preferable that such explanatory information as to attract the interest of the user is added to content downloaded by the speculative download. This explanatory information is a message set as the text option of the index information. In the information processing system 100 of the present embodiment, the sub-system 400 is always in the power-on state. Thus, the user can become aware of the message (explanatory information) from the content distributor without activating the main system 200, so that the content distribution system 1 providing benefits to both the content distributor and the user can be constructed.

<Content Use Processing>

Processing of using accumulated content will be described below.

In the sub-device 420, the communication controller 450 controls communication with the operation input device 120 and the main device 220 as a master. When the user operates the operation input device 120, the receiving section 422 receives operation information and the display processor 470 moves a cursor on the content list display screen according to the operation information. If the receiving section 422 receives predetermined operation information (selection input) when the cursor is disposed on e.g. any of the game icons 502, 503, and 504 (see FIG. 12), the use request acceptor 432 accepts the use request for the content. The transfer section 460 supplies, to the transmitting section 424, the use request including content identification information to identify the content.

The communication controller 450 generates an activation instruction signal for activating the main device 220 in the power-saving mode and makes the activation instruction signal be transmitted before making the use request be transmitted from the transmitting section 424. When the main device 220 is already in the normal power mode, the activation instruction signal does not need to be transmitted. Upon receiving the activation instruction signal, the main device 220 supplies power to the main controller 240 and so forth to activate them. After the activation of the main device 220, the communication controller 450 makes the use request be transmitted from the transmitting section 424. For example, the communication controller 450 may make the use request be transmitted several seconds after the transmission of the activation instruction signal.

In the main device 220, the communication controller 340 controls the communication with the sub-device 420 as a slave. The receiving section 300 receives the use request and the use request acceptor 314 accepts the use request. It is preferable that the main device 220 automatically activates the output device 210 when the receiving section 300 receives the use request. However, the output device 210 may be activated through pressing of the power switch by the user. The use request is supplied to the use request processor 360 and the checking portion 362 checks whether activation processing has been executed for the content included in the use request. The checking portion 362 may refer to the value of the activation check flag included in the index information 386. The activation processing refers to processing of decoding (decrypting) the encrypted content data 382 to make it executable by the content processor 342.

If the checking portion 362 checks that the activation processing has been executed for the content data, the use permission notifier 378 causes a notification of permission of use of the content to be transmitted from the transmitting section 302 to the sub-device 420. Furthermore, the checking portion 362 supplies a content execution instruction to the content processor 342. This causes the content processor 342 to read out the decrypted content data from the storage device 380 and execute the content data.

In the sub-device 420, when the receiving section 422 receives the use permission notification, the use permission acceptor 436 accepts it and supplies it to the communication controller 450. Upon receiving the use permission notification, the communication controller 450 checks that execution processing of the content is possible in the main device 220 and executes processing of switching the present communication environment in which the sub-device 420 serves as the master to a communication environment in which the main device 220 serves as the master. This processing may be referred to as function switch processing. The communication controller 450 generates a master switch instruction to the main device 220 and makes it be transmitted from the transmitting section 424 to the main device 220. In addition, the communication controller 450 disconnects the connection with the main device 220 and the operation input device 120.

In the main device 220, when the receiving section 300 receives the master switch instruction, the communication controller 340 starts communication control as the master. If the connection with the main device 220 is still continued when the master switch instruction is received, the communication controller 340 disconnects the connection with the sub-device 420. As described regarding communication control of the Bluetooth protocol, the Bluetooth terminal enters the "standby" state when a communication link is disconnected. As described above, the communication controller 340 has acquired the identification information of the operation input device 120 and the sub-device 420 in advance. Therefore, it does not need to perform "inquiry" to terminal devices in vicinity and can early establish Bluetooth connections with the operation input device 120 and the sub-device 420 by performing "paging" directly.

Because of the functioning of the main device 220 as the master, the user can transmit operation information for content processing of a game, movie, etc. directly to the main device 220 by operating the operation input device 120. In the case of executing game content, the operation information by the user is information to control the motion of game characters and is required to have a real-time property in many cases. If the operation information is transmitted to the main device 220 via the sub-device 420, this itself causes a transmission delay and therefore this is not preferable. Because of the functioning of the main device 220 as the master, the receiving section 300 can receive the operation information directly from the operation input device 120. Furthermore, the operation information acceptor 312 accepts the operation information and can supply it to the content processor 342 with a small transmission delay. The content processor 342 carries out the execution processing of the content data based on the operation information. Particularly in execution of content for which a real-time property is required, such as a game, the small transmission delay is favorable.

Figure 13:
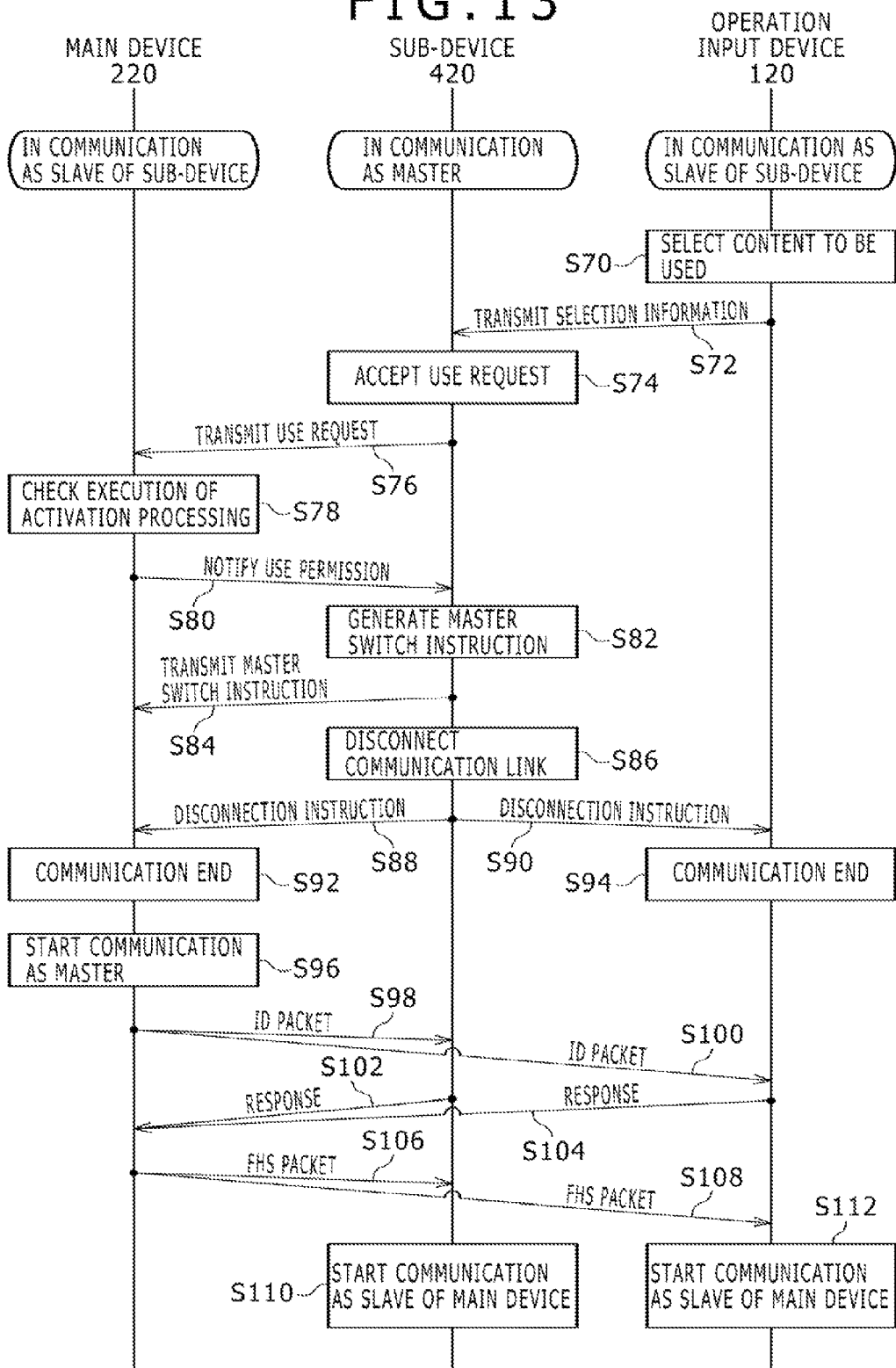
FIG. 13 is a diagram showing function switch processing of master-slave.

FIG. 13 shows the function switch processing of master-slave. As a premise, the sub-device 420 is functioning as a master in the Bluetooth protocol and the main device 220 and the operation input device 120 are functioning as slaves.

The operation input device 120 generates a selection input of content to be used (S70) and transmits it to the sub-device 420 (S72). The sub-device 420 accepts the selection input of the content as a use request for the content (S74) and transmits it to the main device 220 (S76). Upon receiving the use request, the main device 220 checks whether activation processing has been executed for the content requested to be used (S78). The case in which the activation processing has not been executed will be described later. Upon checking that the activation processing has been executed, the main device 220 transmits a notification of permission of use of the content to the sub-device 420 (S80).

When receiving the use permission notification, the sub-device 420 recognizes that execution processing of the content is possible in the main device 220 and generates a master switch instruction to the main device 220 (S82) to transmit it to the main device 220 (S84). Furthermore, the sub-device 420 disconnects the communication link with the main device 220 and the operation input device 120 (S86). At this time, the sub-device 420 may transmit a disconnection instruction of the communication link to the main device 220 and the operation input device 120 (S88, S90) so that disconnection processing of the communication link may be voluntarily executed in the main device 220 and the operation input device 120. This can early disconnect the wireless connection. By the above, the communication in which the main device 220 and the operation input device 120 function as slaves of the sub-device 420 ends (S92, S94).

Subsequently, the main device 220 starts communication control as a master based on the master switch instruction (S96). Because holding the identification information of the sub-device 420 and the operation input device 120 in advance, the main device 220 executes the paging procedure without executing the inquiry procedure. Specifically, the main device 220 transmits an ID packet to the sub-device 420 and the operation input device 120 (S98, S100) and the sub-device 420 and the operation input device 120 return a response to the ID packet (S102, S104). Upon receiving these responses, the main device 220 transmits an FHS packet to the sub-device 420 and the operation input device 120 (S106, S108). By the above, the sub-device 420 and the operation input device 120 establish a wireless connection with the main device 220 and each become communicable as a slave of the main device 220 (S110, S112).

Figure 14:
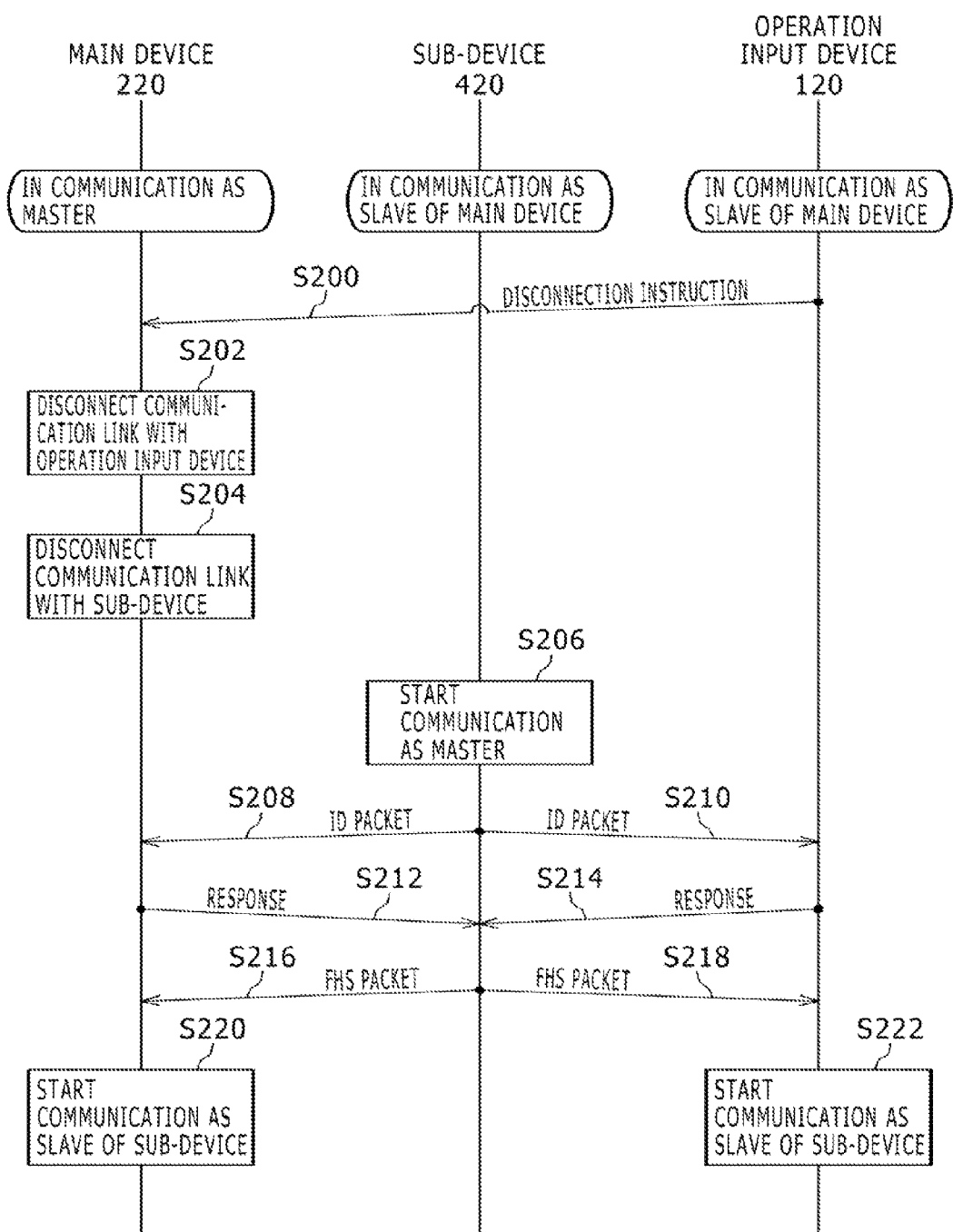
FIG. 14 is a diagram showing another example of the function switch processing of master-slave.

FIG. 14 shows another example of the function switch processing of master-slave. As a premise, e.g. game content is being executed. Furthermore, the main device 220 is functioning as a master in the Bluetooth protocol and the sub-device 420 and the operation input device 120 are functioning as slaves.

For example, the user ends the game play and the operation input device 120 transmits a disconnection instruction of the communication link to the main device 220 (S200). This disconnection instruction may be e.g. one to instruct the main device 220 to be powered off. The main device 220 disconnects the communication link with the operation input device 120 (S202). After disconnecting the communication link with the operation input device 120, the main device 220 disconnects the communication link with the sub-device 420 (S204). The main device 220 may simultaneously disconnect the communication links with the operation input device 120 and the sub-device 420 when receiving the disconnection instruction. Therefore, the communication in which the main device 220 serves as the master ends.

At the elapse of predetermined time after the disconnection of the communication link with the main device 220, the sub-device 420 starts communication control as a master (S206). Because holding the identification information of the main device 220 and the operation input device 120 in advance, the sub-device 420 executes the paging procedure without executing the inquiry procedure. Specifically, the sub-device 420 transmits an ID packet to the main device 220 and the operation input device 120 (S208, S210) and the main device 220 and the operation input device 120 return a response to the ID packet (S212, S214). Upon receiving these responses, the sub-device 420 transmits an FHS packet to the main device 220 and the operation input device 120 (S216, S218). By the above, the main device 220 and the operation input device 120 establish a wireless connection with the sub-device 420 and each become communicable as a slave of the sub-device 420 (S220, S222).

The flowchart shown in FIG. 13 is based on the premise that, in use of accumulated content, activation processing has been already executed for the content data to be used. In the following, the case in which the activation processing has not yet been executed for content data will be described.

In the main device 220, when the receiving section 300 receives a use request from the sub-device 420, the use request acceptor 314 accepts the use request and supplies it to the use request processor 360. The checking portion 362 checks whether activation processing has been executed for the content included in the use request. At this time, if the checking portion 362 checks that the activation processing has not been executed for the content data, it determines whether this content data is data downloaded by the speculative download.

In the content distribution system 1 of the present embodiment, about content downloaded by the immediate download and content downloaded by the suspended download, billing processing is executed at the time of the download. On the other hand, content data downloaded by the speculative download is not data downloaded based on a request by a user originally and therefore billing processing is not executed at the time of the download. Therefore, when the activation processing has not been executed for content data about which a use request is received, the main device 220 carries out a procedure for billing processing in the server system 10 if this content data is data acquired by the speculative download. When the activation processing has not been executed for content data about which a use request is received, the decoder 364 decodes the content data if this content data is data acquired by download other than the speculative download.

If the content data is acquired by the speculative download, the authentication information notifier 370 generates authentication information of the user including the identification information of the content and the transmitting section 302 transmits it to the server system 10. The authentication information is generated based on user information 384. The server system 10 holds the index information 386 held by the main device 220 in synchronization. Therefore, when receiving the identification information of the content included in the authentication information of the user, the server system 10 can check that this content is data acquired by the speculative download. The server system 10 executes billing processing about the content and transmits activation information including a decryption key for decoding to the main device 220.

In the main device 220, when the receiving section 300 receives the activation information, the activation information acceptor 316 accepts it and supplies it to the use request processor 360. The decoder 364 executes decode processing for the encrypted content data by using the decryption key included in the activation information. Therefore, the content data downloaded by the speculative download becomes the usable state. When the decoder 364 completes the decode processing, the checking portion 362 checks that the content included in the use request has been subjected to the activation processing and the function switch processing to turn the main device 220 to a master and turn the sub-device 420 to a slave is executed by the processing shown in FIG. 13.

Figure 15:
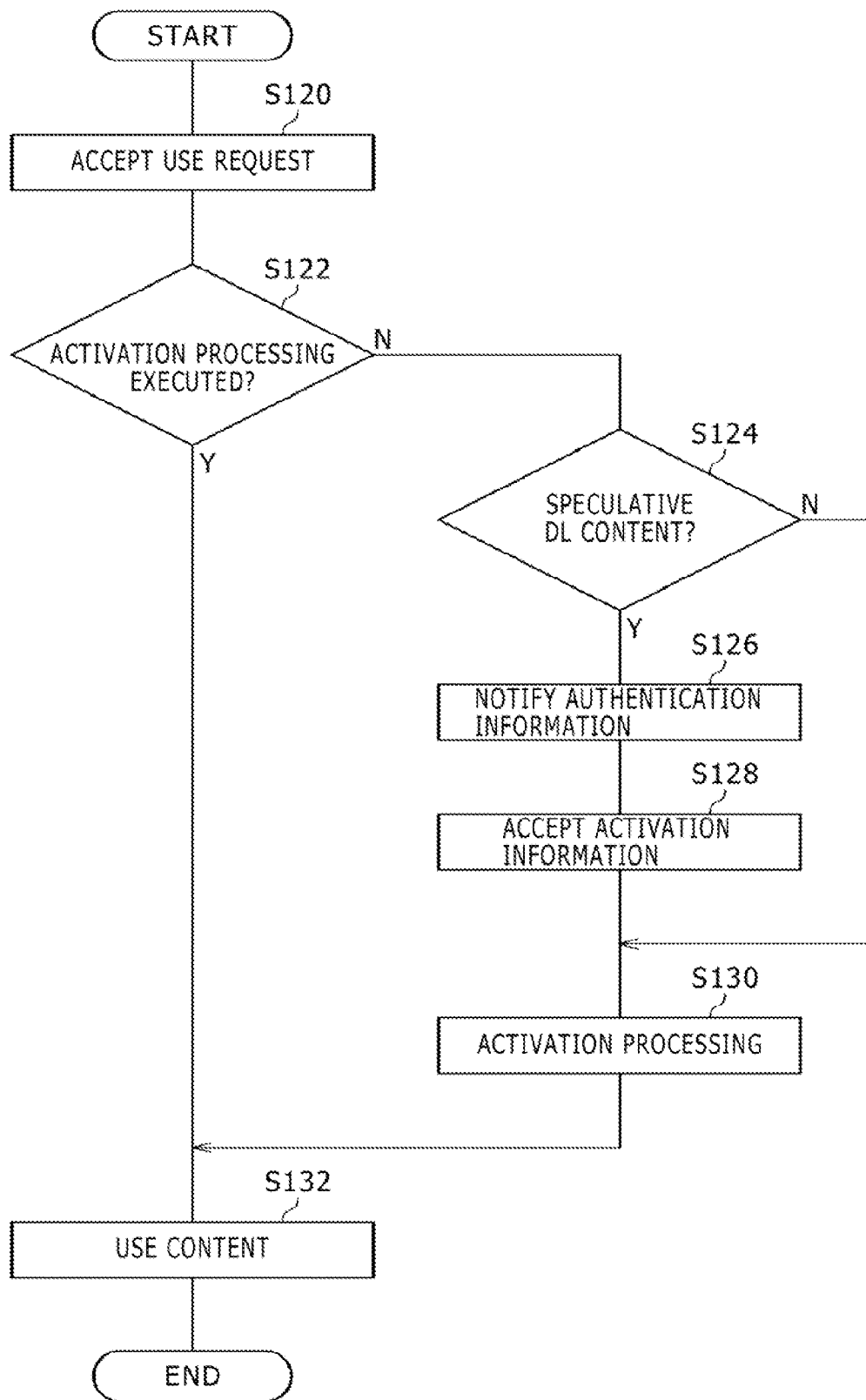
FIG. 15 is a diagram showing processing from reception of a use request to use of content.

FIG. 15 shows processing from reception of a use request to use of content. In the main device 220, the use request acceptor 314 accepts the use request for the content (S120). The checking portion 362 checks whether activation processing has been executed for the content requested to be used (S122). In the case of content for which the activation processing has been executed (Y of S122), the content is in the usable state and the content processor 342 carries out execution processing of the content (S132).

On the other hand, if the activation processing has not been executed for the content requested to be used (N of S122), the checking portion 362 determines whether the content data is data downloaded by the speculative download (S124). If the content data is data downloaded by the immediate download or the suspended download (N of S124), the decoder 364 executes the activation processing of the content data (S130) and the content processor 342 carries out the execution processing of the content (S132).

If the content data is data downloaded by the speculative download (Y of S124), the use permission notifier 378 notifies the server system 10 of authentication information including the identification information of the content (S126). Based on the authentication information, the server system 10 authenticates whether the user is the adequate user and whether the content is content downloaded by the speculative download. If succeeding in the authentication, the server system 10 transmits activation information to the main device 220. When the activation information acceptor 316 accepts the activation information (S128), the decoder 364 executes the activation processing of the content data by using the activation information (S130) and the content processor 342 carries out the execution processing of the content (S132).

<Content Recycle Processing>

In the information processing system 100, an expiration date of activation processing of content downloaded by the speculative download is set. When the expiration date has come, the content data is registered in an unnecessary content list 396. Furthermore, also before the arrival of the expiration date, the user can delete content data that is not used and the deleted content data is registered in the unnecessary content list 396. In the content distribution system 1 of the present embodiment, a mechanism to recycle the content data that is not used to another user is constructed.

In the main device 220, the list generator 352 refers to the index information 386 and periodically searches for content whose expiration date has come. When detecting content whose expiration date has come, the list generator 352 refers to the recycle permission flag of the user information 384 and checks whether the user permits recycle of content. If the user does not permit recycle of content, the content deleting portion 354 deletes the content data 382 from the storage device 380. In addition, the list generator 352 deletes the identification information of the content from the speculative DL list 388. On the other hand, if the user permits recycle of content, the list generator 352 deletes the identification information of the content from the speculative DL list 388 and simultaneously registers the identification information of this content in the unnecessary content list 396.

Furthermore, the user can transmit, to the sub-device 420, a deletion request for content downloaded by the speculative download by operating the operation input device 120. In the sub-device 420, when the receiving section 422 receives the deletion request for the content, the deletion request acceptor 438 accepts it and the transfer section 460 makes the deletion request be transmitted from the transmitting section 424 to the main device 220. In the main device 220, when the receiving section 300 receives the deletion request, the deletion request acceptor 322 accepts the deletion request and supplies it to the content managing section 350. The list generator 352 refers to the recycle permission flag of the user information 384 and checks whether the user permits recycle of content. If the user does not permit recycle of content, the content deleting portion 354 deletes the content data 382 from the storage device 380. In addition, the list generator 352 deletes the identification information of the content from the speculative DL list 388. On the other hand, if the user permits recycle of content, the list generator 352 deletes the identification information of the content from the speculative DL list 388 and simultaneously registers the identification information of this content in the unnecessary content list 396.

The content registered in the unnecessary content list 396 is transmitted to another user by P2P communication when a transfer (download) request is issued from this another user. Specifically, if the transfer request acceptor 318 accepts a transfer request for content included in the unnecessary content list 396 from another user, the transfer processor 374 transfers the content data to this user by P2P communication. This can effectively recycle the content data that is originally scheduled to be deleted and can reduce the load of the distribution server in the server system 10. For example, the server system 10 may give predetermined points to the user who has recycled the content data 382.

The following way may also be employed. Specifically, the transfer processor 374 transfers part of content data. Furthermore, the content data aggregates part by part on the terminal device of the user who has requested the transfer from each of plural users so that all data may be collected finally. A limitation may be so imposed that the transfer request acceptor 318 accepts only a transfer request from a member in a specific group for example. Alternatively, transfer requests from all users may be accepted without imposing a user limitation.

The list generator 352 refers to the index information 386 and periodically searches for content whose time limit of recycle has come. When detecting content whose time limit of recycle has come, the list generator 352 deletes the identification information of the content from the unnecessary content list 396. In addition, the content deleting portion 354 deletes the content data 382 from the storage device 380. This can increase the free space in the storage device 380.

The present invention is described above based on the embodiment. It will be understood by those skilled in the art that this embodiment is exemplification and various modification examples are possible in the combinations of the respective constituent elements and the respective processing processes thereof and such modification examples also fall within the scope of the present invention. Although it is explained that the operation input device 120 always functions as a slave in the embodiment, the operation input device 120 may be so configured as to function as a master in the information processing system 100.

In the content distribution system 1 of the present embodiment, an expiration date (time limit of accumulation) is set for content downloaded by the speculative download. If the user does not permit recycle, the content deleting portion 354 deletes the content data from the storage device 380 when the expiration date has come. Even before the arrival of the expiration date, when the free space in the storage device 380 has become equal to or smaller than a predetermined capacity for example, the content deleting portion 354 may delete content data sequentially from content data having the earliest expiration date. This can ensure a proper free space in the storage device 380.

Furthermore, if a use request is issued from a user in the speculative download of content, the transfer processor 374 may supplement the deficient data by the immediate download or the suspended download without deletion of the content data that has been already downloaded by the speculative download.

FIG. 16 shows a modification example of the information processing system 100. In this modification example, the sub-system 400 has a form of a tablet terminal arising from integration of the output device 410 and the sub-device 420 in FIG. 2. The output device 210 and the main device 220 form the main system 200 and the main device 220 has a cradle part. In FIG. 16, a state in which the sub-system 400 is housed in the cradle part of the main device 220 is shown. When being housed in the cradle part, the sub-system 400 is charged by power supplied from the main device 220.

While being housed in the cradle part, the sub-system 400 connects to a connection pin provided at the cradle part and performs transmission of information with the main device 220 via the connection pin. On the other hand, when being removed from the cradle part, the sub-system 400 wirelessly connects to the main device 220 to transmit information.

REFERENCE SIGNS LIST

1 . . . Content distribution system, 10 . . . Server system, 12 . . . Network, 14 . . . Terminal device, 100 . . . Information processing system, 120 . . . Operation input device, 200 . . . Main system, 210 . . . Output device, 220 . . . Main device, 300 . . . Receiving section, 302 . . . Transmitting section, 310 . . . Accepting section, 312 . . . Operation information acceptor, 314 . . . Use request acceptor, 316 . . . Activation information acceptor, 318 . . . Transfer request acceptor, 320 . . . DL request acceptor, 322 . . . Deletion request acceptor, 324 . . . Speculative DL content information acceptor, 330 . . . Acquiring section, 340 . . . Communication controller, 342 . . . Content processor, 350 . . . Content managing section, 352 . . . List generator, 354 . . . Content deleting portion, 356 . . . Point calculator, 360 . . . Use request processor, 362 . . . Checking portion, 364 . . . Decoder, 370 . . . Authentication information notifier, 372 . . . DL processor, 374 . . . Transfer processor, 376 . . . Display information notifier, 378 . . . Use permission notifier, 380 . . . Storage device, 382 . . . Content data, 384 . . . User information, 386 . . . Index information, 388 . . . Speculative DL list, 390 . . . Immediate DL list, 392 . . . Suspended DL list, 394 . . . Point accumulation information, 396 . . . Unnecessary content list, 398 . . . Unaccumulated content list, 400 . . . Sub-system, 410 . . . Output device, 420 . . . Sub-device, 422 . . . Receiving section, 424 . . . Transmitting section, 430 . . . Accepting section, 432 . . . Use request acceptor, 434 . . . DL request acceptor, 436 . . . Use permission acceptor, 438 . . . Deletion request acceptor, 440 . . . Display information acquirer, 450 . . . Communication controller, 460 . . . Transfer section, 470 . . . Display processor, 480 . . . Storage device, 482 . . . Display information.

INDUSTRIAL APPLICABILITY

The present invention can be utilized in a technical field of information processing.

The invention claimed is:

1. An information processing system that connects to a server by a network, the information processing system comprising:
 a first accepting section that accepts content information selected by the server without being selected by a user of the information processing system;
 a download processor that downloads content data identified by the content information accepted by the first accepting section without the user deciding to request a download of the content data;
 a content managing section that cooperates with the download processor in order to control the downloading of the content in accordance with a selectable mode, including:
  (i) an immediate download mode in which a request to download the content is transmitted from the information processing system to the server substantially immediately after the content information is accepted by the first accepting section,
  (ii) a suspended download mode in which a request to download the content is transmitted from the information processing system to the server at a scheduled time after the content information is accepted by the first accepting section,
  (iii) a speculative download mode in which a request to download the content is transmitted from the information processing system to the server based on a prediction that the user will wish to execute the content; and
 a storage device that stores the downloaded content data.

2. The information processing system according to claim 1, further comprising:
 a list generator that generates a list of the content information accepted by the first accepting section,
 wherein the download processor downloads the content data based on the generated list.

3. The information processing system according to claim 1, wherein the download processor sets time of start of the download of the content data.

4. The information processing system according to claim 1, further comprising:
 a second accepting section that accepts a use request for content data from the user;
 a use request processor that checks whether the content data requested to be used is usable; and
 an authentication information notifier that notifies user authentication information to the server if the content data is not usable.

5. The information processing system according to claim 4, further comprising:
 a third accepting section that accepts, from the server, activation information for making the content data usable as a response to the notified user authentication information,
 wherein the use request processor decodes the content data by using the activation information.

6. A content download method comprising:
 accepting content information at an information processing system over a network from a server, where the content information is selected by the server without being selected by a user of the information processing system;
 downloading content data identified by the accepted content information without the user deciding to request a download of the content data;
 controlling the downloading of the content in accordance with a selectable mode, including:
  (i) an immediate download mode in which a request to download the content is transmitted from the information processing system to the server substantially immediately after the content information is accepted by the first accepting section,
  (ii) a suspended download mode in which a request to download the content is transmitted from the information processing system to the server at a scheduled time after the content information is accepted by the first accepting section,
  (iii) a speculative download mode in which a request to download the content is transmitted from the information processing system to the server based on a prediction that the user will wish to execute the content; and
 storing the downloaded content data.

7. A computer having a microprocessor operating under the control of a program for causing the computer to implement actions, comprising:
 accepting content information at an information processing system over a network from a server, where the content information is selected by the server without being selected by a user of the information processing system;
 downloading content data identified by the accepted content information without the user deciding to request a download of the content data;
 controlling the downloading of the content in accordance with a selectable mode, including:

(i) an immediate download mode in which a request to download the content is transmitted from the information processing system to the server substantially immediately after the content information is accepted by the first accepting section, (ii) a suspended download mode in which a request to download the content is transmitted from the information processing system to the server at a scheduled time after the content information is accepted by the first accepting section, (iii) a speculative download mode in which a request to download the content is transmitted from the information processing system to the server based on a prediction that the user will wish to execute the content; and storing the downloaded content data.

8. A non-transitory computer-readable recording medium in which the program according to claim 7 is recorded.

9. An information processing system comprising:

a main system including a main device having a first communication section, a first display, a microprocessor operating to execute content, and executable content data;

a sub-system including a sub-device having a second communication section that is communicable with the first communication section such that the main device and the sub-device are communicable with one another in a plurality of master slave relationships, and a second display that is significantly smaller than the first display, where the sub-system includes an input interface device which transmits inputs from a user's manipulation of the input interface device to the main device, such inputs including inputs from the user to the main device during execution of the content data to provide an interactive experience for the user; and further input interface device that has a third communication section capable of communicating with the first communication section and the second communication section, which transmits inputs from the user to the main device and the sub-device, such inputs including inputs from the user's manipulation of the further input interface device to the main device during execution of the content data to provide an interactive experience for the user, wherein:

when a status of the content data is such that the content data requires authentication through communications between the main system and a network server over a communications network, the sub-system operates as a master and the main system operates as a slave of the sub-system; and when the status of the content data changes as a result of the authentication such that the content data no longer requires authentication, the sub-system initiates function switch processing in which the main system operates as a master and both the sub-system and the further input interface device operate as slaves of the master system.

10. The information processing system according to claim 9, wherein either the main device or the sub-device may be placed into a mode that functions as a master, and the further input interface device is capable of transmitting an input from the user to the main device and the sub-device that functions as the master.

11. The information processing system according to claim 10, wherein if the main device is in a power-saving mode, the sub-device functions as the master and transmits an activation instruction to the main device when receiving a predetermined input from the further input interface device.

12. The information processing system according to claim 9, wherein: the second display displays an image or text relating to the content data held by the main device.

13. The information processing system according to claim 12, wherein the sub-device transmits a use request to the main device to carry out the function switch processing.

* * * * *